United States Patent
Aramaki et al.

(10) Patent No.: US 10,956,238 B2
(45) Date of Patent: Mar. 23, 2021

(54) PROGRAMMABLE CONTROLLER, MANAGEMENT DEVICE, AND CONTROL SYSTEM

(71) Applicant: TOSHIBA MITSUBISHI-ELECTRIC INDUSTRIAL SYSTEMS CORPORATION, Chuo-ku (JP)

(72) Inventors: Naruhiko Aramaki, Chuo-ku (JP); Hiroyuki Fujieda, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 0 days.

(21) Appl. No.: 16/473,421

(22) PCT Filed: Dec. 4, 2017

(86) PCT No.: PCT/JP2017/043532
§ 371 (c)(1),
(2) Date: Jun. 25, 2019

(87) PCT Pub. No.: WO2018/123456
PCT Pub. Date: Jul. 5, 2018

(65) Prior Publication Data
US 2020/0151033 A1    May 14, 2020

(30) Foreign Application Priority Data

Dec. 27, 2016   (JP) .............................. JP2016-252441

(51) Int. Cl.
*G06F 9/54*      (2006.01)
*G06F 9/50*      (2006.01)

(52) U.S. Cl.
CPC ............ *G06F 9/543* (2013.01); *G06F 9/5011* (2013.01)

(58) Field of Classification Search
None
See application file for complete search history.

(56) References Cited

U.S. PATENT DOCUMENTS

| 2011/0270421 A1 | 11/2011 | Kawamoto et al. |
| 2014/0068613 A1 | 3/2014 | Iriguchi et al. |

(Continued)

FOREIGN PATENT DOCUMENTS

| JP | 2003-295910 A | 10/2003 |
| JP | 2007-18268 A | 1/2007 |

(Continued)

OTHER PUBLICATIONS

International Search Report dated Jan. 23, 2018 in PCT/JP2017/043532, citing documents AA, AB and AO-AU therein, 2 pages.

(Continued)

*Primary Examiner* — Syed A Roni
(74) *Attorney, Agent, or Firm* — Oblon, McClelland, Maier & Neustadt, L.L.P.

(57) ABSTRACT

A programmable controller includes a plurality of processor cores, an input unit, an allocating unit, a transmitting unit, a power controlling unit, an updating unit, and an executing unit. The allocating unit allocates any one of the plurality of processing to each of the plurality of processor cores. The transmitting unit transmits an allocation result of the processing to a management device. The power controlling unit restarts when the allocation of the processing is changed in the management device and the input unit inputs the changed setup data. The updating unit updates the allocation to the plurality of processor cores based on the setup data after the restart. The executing unit executes the plurality of processing based on the allocation, and when the allocation is changed, executes the plurality of processing based on the changed allocation.

6 Claims, 14 Drawing Sheets

(56) References Cited

U.S. PATENT DOCUMENTS

| | | | |
|---|---|---|---|
| 2015/0154054 A1 | 6/2015 | Ohno et al. | |
| 2016/0085226 A1 | 3/2016 | Tanaka | |
| 2016/0091882 A1* | 3/2016 | Ludwig et al. | |

FOREIGN PATENT DOCUMENTS

| | | |
|---|---|---|
| JP | 2007-94898 A | 4/2007 |
| JP | 2011-233113 A | 11/2011 |
| JP | 2012-108883 A | 6/2012 |
| JP | 2012-141722 A | 7/2012 |
| JP | 2014-67402 A | 4/2014 |
| JP | 2014-81765 A | 5/2014 |
| JP | 2015-106298 A | 6/2015 |
| JP | 2016-100881 A | 5/2016 |
| WO | WO 2014/162575 A1 | 10/2014 |

OTHER PUBLICATIONS

Combined Taiwanese Office Action and Search Report dated Nov. 2, 2018 in Patent Application No. 106145280 (with English translation), citing documents AM-AQ therein, 15 pages.

Notice of Reasons for Refusal dated Jun. 9, 2020 in Japanese Patent Application No. 2016-252441 (with unedited computer generated English translation), 7 pages.

Notification of Reason for Refusal dated Oct. 19, 2020 in Korean Patent Application No. 10-2019-7017786 (with English machine translation), 12 pages.

Office Action dated Nov. 17, 2020 in Japanese Patent Application No. 2016-252441 (with English translation), 7 pgs.

Office Action dated Jan. 12, 2021 in Korea Patent Application No. 10-2017,7017786 (with English translation); 9 pgs.

* cited by examiner

| PROCESSING | I/O INTERFACE | NON-SEPARABLE PROCESSING | CORE | ... |
|---|---|---|---|---|
| A | I/O INTERFACE 25a | – | A | ... |
| B | I/O INTERFACE 25b | – | A | ... |
| ⋮ | ⋮ | ⋮ | ⋮ | ⋮ |
| X | – | Y | A | ... |
| Y | – | X | A | ... |

| CORE | THE NUMBER OF UPPER LIMIT OF I/O INTERFACES | ALLOCATION IMPOSSIBLE INTERFACE | ... |
|---|---|---|---|
| A | 5 | I/O INTERFACE 25c | ... |
| B | 5 | – | ... |

(a)

(b)

(a)

(b)

PROGRAMMABLE CONTROLLER, MANAGEMENT DEVICE, AND CONTROL SYSTEM

CROSS-REFERENCE TO RELATED APPLICATIONS

This application is national stage application of International Application No. PCT/JP2017/043532, filed Dec. 4, 2017, which designates the United States, incorporated herein by reference, and which is based upon and claims the benefit of priority from Japanese Patent Application No. 2016-252441, filed Dec. 27, 2016, the entire contents of each of which are incorporated herein by reference.

TECHNICAL FIELD

An embodiment of the present invention relates to a programmable controller, a management device, and a control system.

BACKGROUND ART

Conventionally, in a programmable controller (programmable logic controller (PLC)) including a multi-core central processing unit (CPU) (multi-core processor) in which a plurality of processor cores are included in one CPU (CPU package), each processor core improves processing capacity by performing separate processing in parallel.

CITATION LIST

Patent Literature

Patent Document 1: JP 2007-94898 A
Patent Document 2: JP 2012-141722 A

SUMMARY OF INVENTION

Problem to be Solved by the Invention

However, in the conventional technology, an allocation of processing to each processor core is determined by an application program dedicated to each programmable controller. For this reason, in the conventional technology, it is necessary to modify the application program in order to change the allocation of processing to each processor core, and as a result, it is also necessary to compile the modified application program. For this reason, it has been difficult for conventional technology to dynamically and quickly change the allocation of processing to the processor core. In such conventional technologies, it has been requested that the programmable controller be able to change the allocation of processing to each processor core more flexibly.

Means for Solving Problem

A programmable controller according to an embodiment includes: a plurality of processor cores, the programmable controller including: an input unit configured to input from a management device connected to the programmable controller, an application program for being executed in the plurality of processor cores, and setup data including information on a plurality of processing included in the application program; an allocating unit configured to allocate any one of the plurality of processing to each of the plurality of processor cores; a transmitting unit configured to transmit the plurality of processor cores and an allocation result of the plurality of processing to the management device; a power controlling unit configured to restart when the allocation of the plurality of processing to the plurality of processor cores is changed in the management device and the input unit inputs the setup data to which information on the changed allocation is added; an updating unit configured to update the allocation to the plurality of processor cores based on the setup data after the restart; and an executing unit configured to execute the plurality of processing based on the allocation, and when the allocation is changed, execute the plurality of processing based on the changed allocation.

DESCRIPTION OF EMBODIMENTS

First Embodiment

Figure 1:
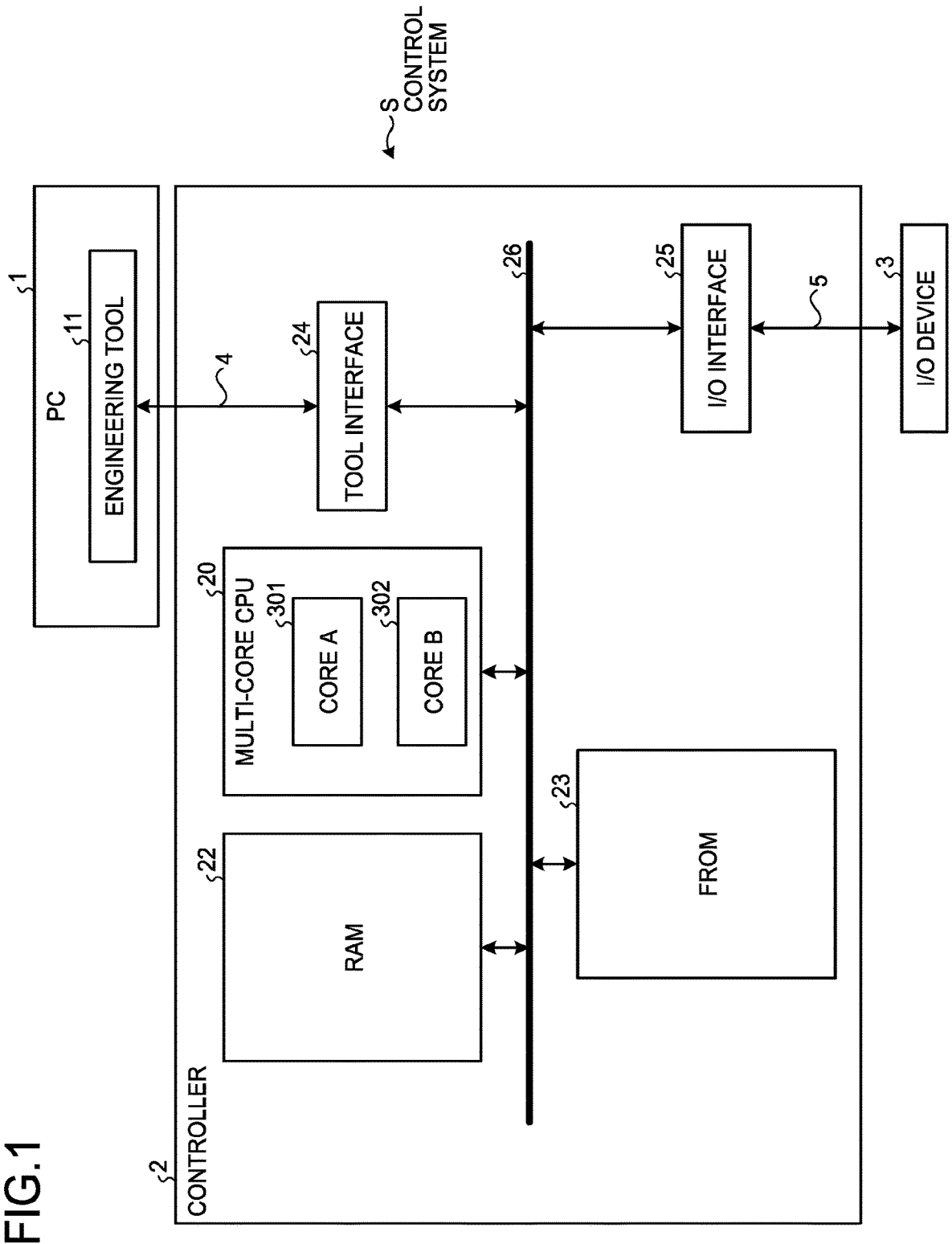
FIG. 1 is a diagram illustrating an example of an overall configuration of a control system according to a first embodiment.

FIG. 1 is a diagram illustrating an example of an overall configuration of a control system S according to a first embodiment. The control system S according to the present embodiment is applied to, for example, a plant. As illustrated in FIG. 1, the control system S includes a personal computer (PC) 1, and a programmable controller (programmable logic controller (PLC) (hereinafter, referred to as a controller)) 2.

The PC 1 is a computer used by a user to generate an application program to be executed in the controller 2 and to monitor an operation status of the controller 2. The PC 1 has an engineering tool 11, which is software. The engineering tool 11 is software that performs system construction, programming, monitoring, information collection and observation related to the control system S. The PC 1 manages the controller 2 by a function of the engineering tool 11. The PC 1 is an example of a management device according to the present embodiment. Details of the PC 1 and the engineering tool 11 will be described later.

As illustrated in FIG. 1, the controller 2 includes a multi-core CPU (multi-core processor) 20, a random access memory (RAM) 22, a flash read only memory (FROM) 23, a tool interface 24, an I/O interface 25, and a bus 26.

The multi-core CPU 20 is a CPU having a plurality of processor cores (hereinafter, referred to as cores). As illustrated in FIG. 1, the multi-core CPU 20 includes a core A 301 and a core B 302. The number of cores in the multi-core CPU 20 illustrated in FIG. 1 is an example, and is not limited to two. The multi-core CPU 20 controls the entire controller 2.

The RAM 22 is an operating area of the multi-core CPU 20 and is a writable storage medium. The FROM 23 is a so-called flash memory and is an electrically rewritable non-volatile semiconductor storage medium.

The tool interface 24 is an interface for transmitting and receiving information to and from the PC 1 via a communication path 4. The communication path 4 is a communication path connecting the PC 1 and the controller 2 to each other, and is a high-speed communication path such as Ethernet (registered trademark) or a universal serial bus (USB), but is not limited thereto.

The I/O interface 25 is an interface for transmitting and receiving information to and from an I/O device 3 via a communication path 5. The communication path 5 is a communication path connecting the controller 2 and the I/O device 3 to each other. In addition, the bus 26 is a data transmission path inside the controller 2.

The I/O device 3 is a device for inputting and outputting with an apparatus constituting the plant. Examples of the I/O device 3 include, for example, input devices (an analog input (AI) device and a digital input (DI) device) for inputting signals from a sensor installed in a control target facility, or output devices (an analog output (AO) device and a digital output (DO) device) for outputting signals to an actuator of the control target facility. In FIG. 1, the numbers of I/O devices 3 and I/O interfaces 25 are described one by one, but is not limited thereto. For example, the numbers of I/O devices 3 and I/O interfaces 25 vary depending on the configuration of the plant.

Figure 2:
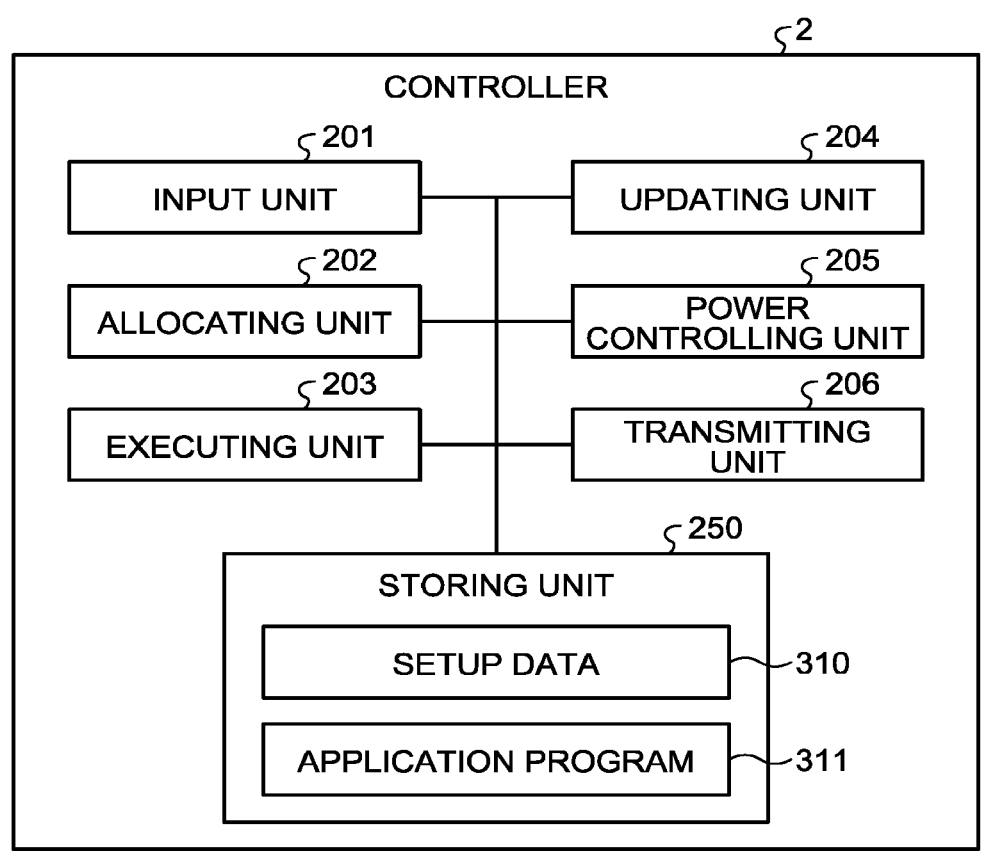
FIG. 2 is a block diagram illustrating an example of a functional configuration of a controller according to the first embodiment.

FIG. 2 is a block diagram illustrating an example of a functional configuration of a controller 2 according to the present embodiment. As illustrated in FIG. 2, the controller 2 includes an input unit 201, an allocating unit 202, an executing unit 203, an updating unit 204, a power controlling unit 205, a transmitting unit 206, and a storing unit 250.

The storing unit 250 is configured by, for example, the FROM 23. In addition, the storing unit 250 stores an application program 311 and setup data 310 that the input unit 201 downloads (receives) from the PC 1. The application program 311 is a program for the controller 2 to control the plant. The application program 311 stored in the storing unit 250 is assumed to be the application program 311 that has been already compiled, that is, the application program 311 in an execution form.

The setup data 310 is definition information that defines information on a plurality of processing included in the application program 311, information on the core A 301 and the core B 302, and the allocation of each processing to the core A 301 and the core B 302. In other words, the definition information included in the application program 311 in the conventional technology is defined outside the application program 311 as the setup data 310 in the present embodiment.

Figures 3A, 3B, 4:
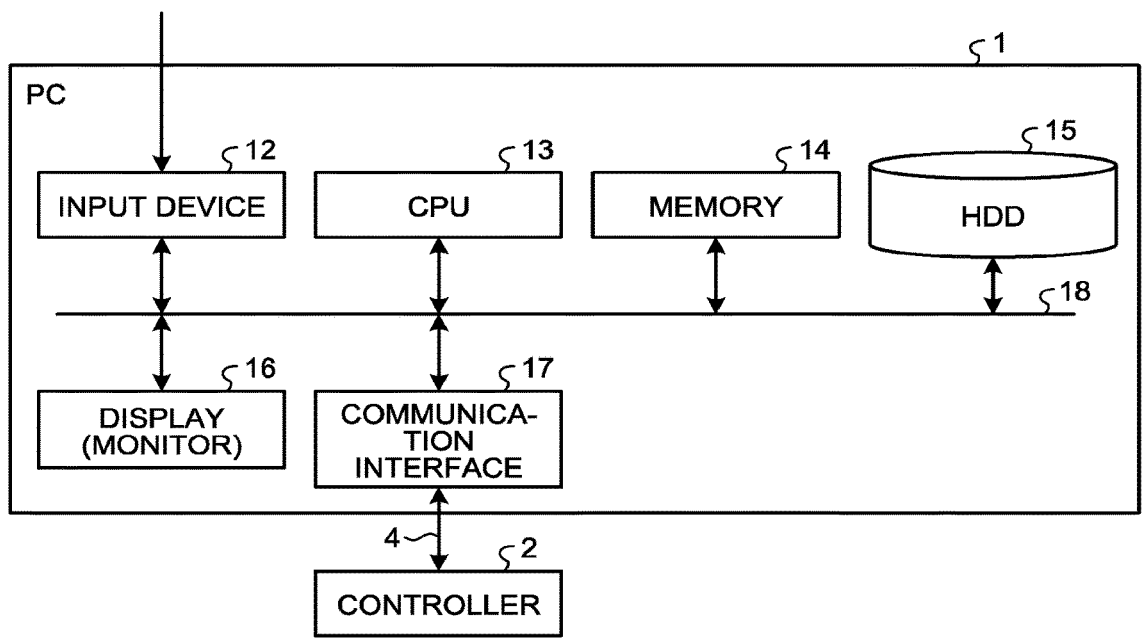
FIG. 3A is a diagram illustrating an example of the configuration and contents of a definition file included in setup data according to the first embodiment.
FIG. 3B is a diagram illustrating an example of the configuration and contents of another definition file included in the setup data according to the first embodiment.
FIG. 4 is a diagram illustrating an example of a hardware configuration of a personal computer (PC) according to the first embodiment.

FIGS. 3A and 3B are diagrams illustrating examples of the configurations and contents of definition files 313a and 313b included in the setup data 310 according to the present embodiment. The setup data 310 according to the present embodiment includes a definition file 313a and a definition file 313b.

As illustrated in FIG. 3A, the definition file 313a includes, for example, definition information such as "processing", "I/O interface", "non-separable processing", "core", and the like. The "processing" is processing included in the application program 311. The "I/O interface" is information that specifies the I/O interface 25 used in each processing included in the application program 311. The "non-separable processing" is information on a combination of a plurality of processing that cannot be allocated to different cores. The "core" is an allocation of the core A 301 or the core B 302 in which each processing is executed.

The setup data 310 is generated by the engineering tool 11 of the PC 1, but each processing is not allocated to the core A 301 and the core B 302 at the time of point of generation. For this reason, in the setup data 310 at the time of point of generation, the item "core" in FIG. 3A is blank (unallocated). The allocation of each processing to the core A 301 and the core B 302 is determined by an allocating unit 202 to be described later. In addition, when the engineering tool 11 of the PC 1 changes the allocation of the processing, the PC 1 registers the changed allocation in the setup data 310.

In addition, as illustrated in FIG. 3B, the definition file 313b includes definition information on "the number of upper limit of I/O interfaces" and "allocation impossible interface" of the core A 301 and the core B 302. "The number of upper limit of I/O interfaces" is a specified value of the upper limit of the number of I/O interfaces 25 corresponding to each processing allocated to the core A 301 and the core B 302. In addition, the "allocation impossible interface" is a definition that prohibits the allocation of processing corresponding to a specific I/O interface 25 to the core A 301 or the core B 302.

The configurations and contents of the setup data 310 illustrated in FIGS. 3A and 3B are examples and are not limited thereto. In addition, the number of definition files included in the setup data 310 is not limited to two. For example, the setup data 310 may be configured to include the contents of the definition file 313a and the definition file 313b in one definition file.

Returning to FIG. 2, the input unit 201 inputs (downloads) the application program 311 and the setup data 310 from the PC 1 via the tool interface 24. The input unit 201 stores the inputted application program 311 and setup data 310 in the storing unit 250. In addition, when the allocation of the processing to the core A 301 and the core B 302 determined by the allocating unit 202 to be described later is changed by the operation of the user in the PC 1, the input unit 201 inputs the setup data 310 in which the changed allocation is registered. The input unit 201 stores the setup data 310 in which the changed allocation is registered in the storing unit 250. In this case, the input unit 201 may overwrite the setup data 310 already stored in the storing unit 250 and store the setup data 310 in which the changed allocation is registered.

The allocating unit 202 allocates one of the plurality of processing included in the application program 311 to each of the core A 301 and the core B 302. Specifically, when the executing unit 203 starts the application program 311, the allocating unit 202 searches for processing to be executed from the setup data 310, and allocates the processing to the core A 301 or the core B 302.

The allocating unit 202 allocates each processing to the core A 301 and the core B 302 so that the overall processing of the application program 311 can be executed efficiently. For example, the allocating unit 202 searches for processing using the same I/O interface 25 from the setup data 310, and preferentially allocates these processing to the same core A 301 or core B 302. By performing the plurality of processing using the same I/O interface 25 in the same core A 301 or core B 302, the allocating unit 202 can reduce the number of times of input and output of the I/O interface 25 and reduce an entire processing time of the application program 311.

In addition, the allocating unit 202 reduces the entire processing time of the application program 311 by preferentially allocating processing that can be executed simultaneously in parallel to different core A 301 and core B 302. For example, the allocating unit 202 determines that processing that is not defined as the non-separable processing in the setup data 310 can be executed simultaneously in parallel. The allocating unit 202 may be configured as a function of an operating system (OS) of the controller 2, for example.

In the conventional technology, the allocation of the processing to each core was specified in a code of the application program 311 or determined by a compiler. For this reason, each application program 311 is dedicated to a specific controller, and for example, it was difficult to use the application program 311 with other controllers having a different number of cores. In the present embodiment, since the allocating unit 202 of the controller 2 allocates the processing to the core A 301 and the core B 302, the application program 311 does not include the information specifying the core to execute each processing. For this reason, the controller 2 according to the present embodiment can share and use the same application program 311 with other controllers having different configurations such as the number of cores.

The allocating unit 202 registers the allocation of each processing to the core A 301 and the core B 302 to the setup data 310. In addition, when the setup data 310 already includes the information on the allocation of each processing and the core A 301 and the core B 302, it may be possible to adopt a configuration in which each processing is allocated to the core A 301 and the core B302 according to the setup data 310 as the allocating unit 202. For example, when the controller 2 executes a specific application program 311 multiple times, the configuration in which a previous allocation registered in the setup data 310 is applied may be adopted in the second or subsequent execution.

The power controlling unit 205 controls the power of the controller 2. For example, the power controlling unit 205 reboots (restarts) the controller 2 when the allocation of the processing to the core A 301 and the core B 302 is changed in the PC 1 and the input unit 201 inputs the setup data 310 to which the information on the changed allocation is added.

The updating unit 204 updates the allocation to the core A 301 and the core B 302 based on the setup data 310 stored in the storing unit 250 after the controller 2 is rebooted and to which the information on the changed allocation is added. The updating unit 204 transmits the updated allocation to the executing unit 203. Like the allocating unit 202, the updating unit 204 may be configured as a function of the OS of the controller 2.

The executing unit 203 starts the application program 311. The executing unit 203 may start the application program 311 at a specific time, or may start the application program 311 by the operation of the user or by receiving signals from an external device.

In addition, when the executing unit 203 starts the application program 311, the executing unit 203 executes individual processing included in the application program 311 based on the allocation of the processing to the core A 301 and the core B 302 acquired from the allocating unit 202. In addition, when the executing unit 203 acquires the updated allocation from the updating unit 204, the executing unit 203 executes each processing included in the application program 311 based on the updated allocation. The executing unit 203 may start a re-execution from the processing that was executed before the reboot, or may re-execute the entire application program 311 from the beginning.

The transmitting unit 206 transmits an operation state of each of the core A 301 and the core B 302 to the PC 1. For example, the transmitting unit 206 transmits a result of the allocation of the processing to the core A 301 and the core B 302 to the PC 1 via the tool interface 24 and the communication path 4. In addition, the transmitting unit 206 transmits the processing and the I/O interface 25 used in each processing to the PC 1 via the tool interface 24 and the communication path 4 in manner corresponding to each other.

Next, a configuration of the PC 1 will be described. FIG. 4 is a diagram illustrating an example of a hardware configuration of the PC 1 according to the present embodiment. As illustrated in FIG. 4, the PC 1 includes an input device 12, a CPU 13, a memory 14, a hard disk drive (HDD) 15, a display (monitor) 16, a communication interface 17, and a bus 18.

The input device 12 is, for example, a keyboard, a mouse, a touch panel, or the like and is a device for receiving an operation of a user.

The CPU 13 is a control device that performs an overall control of the PC 1. For example, the CPU 13 realizes various configurations by executing a program or the like stored in the memory 14. The memory 14 is a memory for storing readable data, and is, for example ROM. In addition, it is possible to employ a configuration in which a memory such as a writable RAM is further provided as the PC 1 may.

The HDD 15 is an external storage device (auxiliary storage device). It is may be possible to employ a configuration including a storage medium such as a flash memory, instead of the HDD 15 as the PC 1.

The display 16 is a display device such as a liquid crystal panel, and is an example of a display in the present embodiment. The communication interface 17 is an interface for transmitting and receiving information to and from the controller 2 via the communication path 4. In addition, the bus 18 is a data transmission path inside the PC 1. The configuration of the PC 1 illustrated in FIG. 4 is merely an example, and it is sufficient to be the configuration which provides general computer functions.

Figure 5:
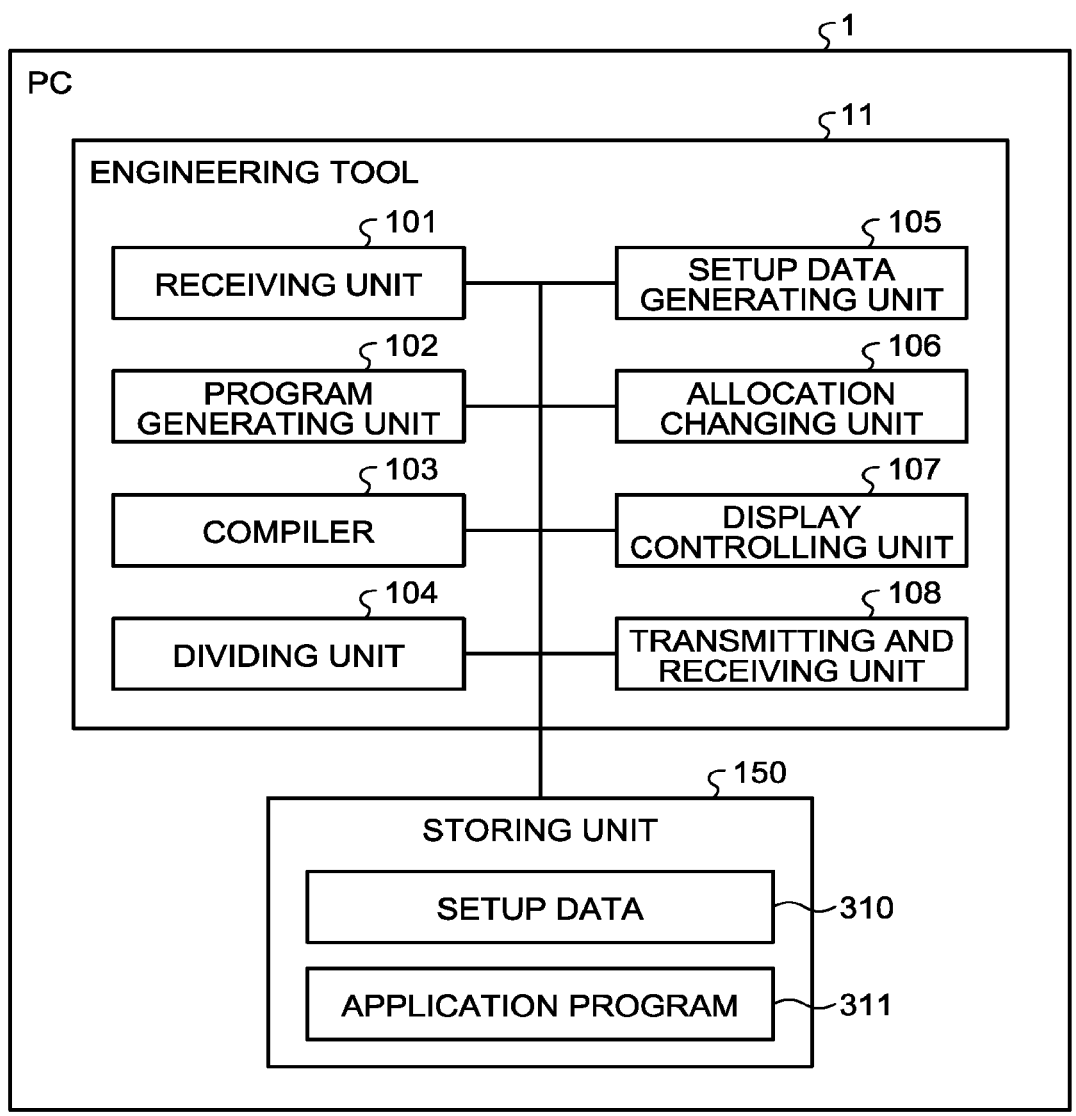
FIG. 5 is a block diagram illustrating an example of a functional configuration of the PC according to the first embodiment.

Next, a functional configuration of the PC 1 will be described. FIG. 5 is a block diagram illustrating an example of a functional configuration of the PC 1 according to the present embodiment. As illustrated in FIG. 5, the engineering tool 11, which is software operating on the PC 1, includes a receiving unit 101, a program generating unit 102, a compiler 103, a dividing unit 104, a setup data generating unit 105, an allocation changing unit 106, a display controlling unit 107, and a transmitting and receiving unit 108. In addition, the PC 1 includes a storing unit 150.

The storing unit 150 is configured by, for example, the HDD 15. Alternatively, the storing unit 150 may be configured by a writable storage medium such as a RAM. The storing unit 150 stores the application program 311 of an execution form, and the setup data 310 generated by the setup data generating unit 105. In addition, the application program 311 stored in the storing unit 150 is not limited to that generated by the program generating unit 102 of the PC 1. For example, a configuration in which the application programs 311 generated by other engineering tools are stored may be adopted.

The receiving unit 101 receives the operation of the user via the input device 12. For example, the receiving unit 101 receives a drag and drop operation for changing the allocation of any one of the plurality of processing displayed on the display 16 by the display controlling unit 107 described later to one of the core A 301 and the core B 302 from the other.

The program generating unit 102 acquires the operation contents of the user from the receiving unit 101 and generates the application program 311 for execution in the controller 2. For example, the program generating unit 102 acquires from the receiving unit 101 the contents that the user sets by operating a function block diagram or a ladder diagram displayed on the display 16, and converts the contents into the application program 311. The user inputs the control process and control contents for controlling the plant by operating the function block diagram, the ladder diagram, or the like.

The control process in the present embodiment includes processes involved in controlling the plant and a work included in each process. In addition, the control contents in the present embodiment is a definition of an execution order and a control method of each process. For example, when the controller 2 generates an application program 311 that sequentially advances each process in a predetermined order, the user sets the execution order of each process as a sequence control. In addition, when the controller 2 generates an application program 311 that repeats a predetermined process or work, the user sets the execution order of each process or work as a loop control. The sequence control and the loop control may be mixed in one application program 311. In addition, the control contents are not limited to the sequence control and the loop control, but a configuration in which other types of control can be set may be adopted. The program generating unit 102 acquires the operation contents of the user from the receiving unit 101 and converts the operation contents of the user into the application program 311.

The compiler 103 converts the application program 311 generated by the program generating unit 102 into a format executable by the controller 2. The compiler 103 stores the application program 311 in the compiled form, that is, the application program 311 in the execution form, in the storing unit 150.

The dividing unit 104 divides the application program 311 in the execution form into a plurality of processing. For example, the dividing unit 104 divides the application program 311 into processing units for executing the processes in a plurality of threads when the application program 311 is executed. The division unit of processing is an example, and is not limited thereto. The dividing unit 104 transmits a division result of the application program 311 to the setup data generating unit 105.

In addition, the application program 311 is not limited to that generated by the program generating unit 102. For example, it may be possible to adopt a configuration in which an application program 311 generated by another engineering tool is acquired from the storing unit 150 and is divided into the plurality of processing as the dividing unit 104. In the present embodiment, the compiler 103 and the dividing unit 104 are separated, but the present invention is not limited thereto. For example, a configuration in which the compiler 103 divides the processing may also be adopted.

The setup data generating unit 105 generates setup data 310 including a plurality of processing information included in the application program 311. For example, the setup data generating unit 105 acquires definition information capable of specifying each divided processing from the dividing unit 104, and registers the definition information in the definition file 313a, as illustrated in FIG. 3A. In addition, the setup data generating unit 105 acquires information specifying the I/O interface 25 used in each processing from the application program 311, and registers the information in the definition file 313a in association with the definition information that can specify each processing.

In addition, the setup data generating unit 105 registers information on a combination of non-separable processing, which is a plurality of processing that cannot be allocated to different core A 301 and core B 302, in the plurality of processing, in the definition file 313a. As an example of the non-separable processing, there is processing included in the same loop in the application program 311 that performs the loop control. In addition to this, it may be possible to adopt as the setup data generating unit 105 a configuration in which the combination of processing that cannot be allocated to different core A 301 and core B 302 is registered as the non-separable processing in the definition file 313a, for reasons such as the context of processing and the like.

In addition, the setup data generating unit 105 registers the number of upper limit of the I/O interfaces 25 corresponding to the processing allocated to the core A 301 or the core B 302 in the definition file 313b, as illustrated in FIG. 3B. In addition, the setup data generating unit 105 registers the I/O interface 25, which cannot be allocated to a specific core A 301 or core B 302, in the definition file 313b, as illustrated in FIG. 3B. The setup data generating unit 105 acquires, for example, from the receiving unit 101, the number of upper limit and the allocation impossible interface of the I/O interfaces 25 inputted by the user as an input value, and registers the input value in the definition file 313b.

The transmitting and receiving unit 108 transmits and receives information and data to and from the controller 2 via the communication interface 17 and the communication path 4. For example, the transmitting and receiving unit 108 transmits the application program 311 compiled by the compiler 103 and the setup data 310 generated by the setup data generating unit 105 to the controller 2.

In addition, when the controller 2 starts the application program 311, the transmitting and receiving unit 108 receives an operation state of each of the core A 301 and the core B 302 from the controller 2. Specifically, the transmitting and receiving unit 108 receives (acquires) the result of allocating the plurality of processing to each of the core A 301 and the core B 302, and the correspondence between the I/O interface 25 and each processing, from the controller 2.

The display controlling unit 107 controls display contents of the display 16. For example, the display controlling unit 107 displays the function block diagram or the ladder diagram that the user uses to generate the application program 311 on the display 16. In addition, for example, the display controlling unit 107 acquires the allocation of the plurality of processing to the core A 301 and the core B 302 in the controller 2 and the correspondence between each processing and the I/O interface 25, from the transmitting and receiving unit 108, and displays them on the display 16. In other words, the display controlling unit 107 provides a monitoring screen for changing the allocation of the processing if necessary to the user to let the user to monitor the operation state of the core A 301 and the core B 302 of the controller 2.

Figure 6:
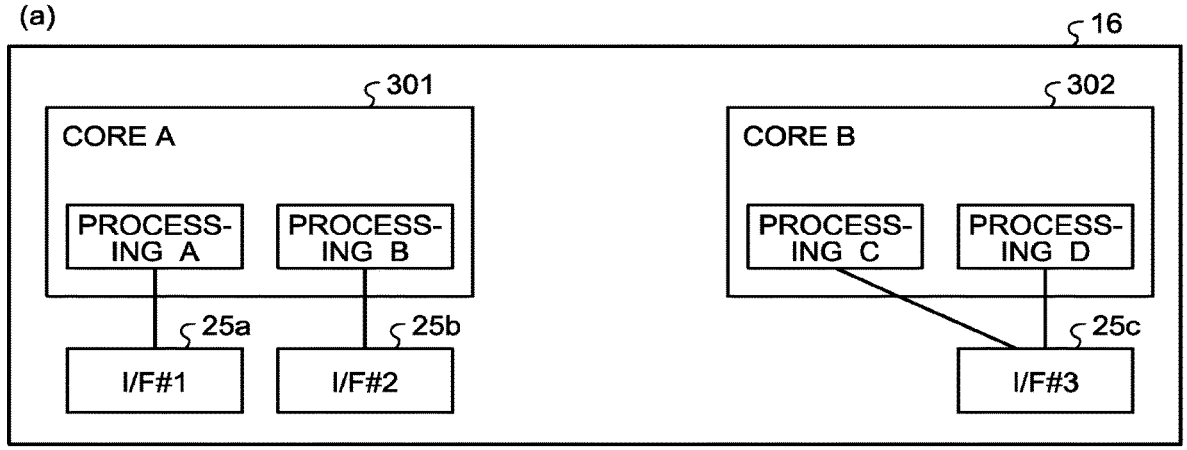
FIG. 6 is a diagram illustrating an example of a monitoring screen according to the first embodiment.
Figure 6:
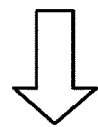
Figure 6:
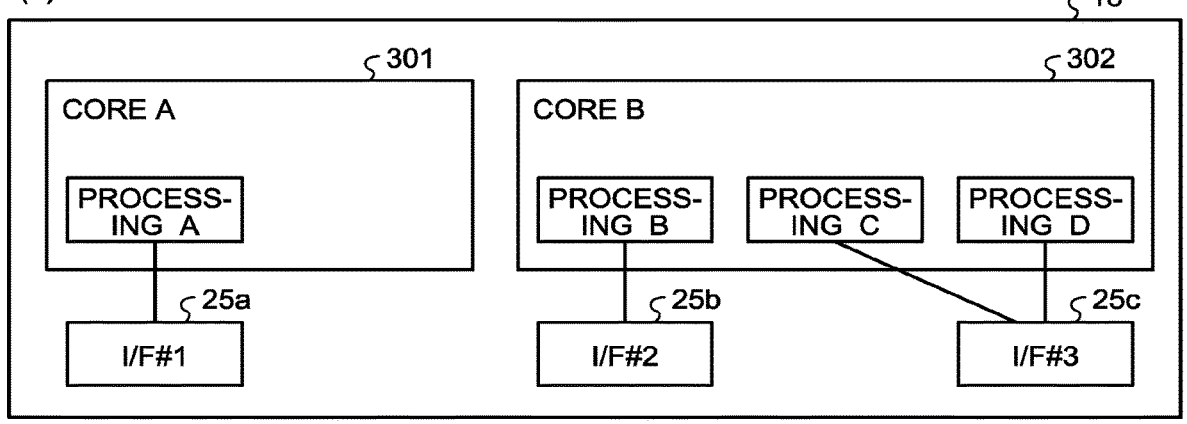

The contents displayed on the display 16 by the display controlling unit 107 will be described with reference to FIG. 6. FIG. 6 is a diagram illustrating an example of a monitoring screen according to the present embodiment. FIG. 6 illustrate a screen of a graphic user interface (GUI) displayed on the display 16. An upper section of FIG. 6 is a screen illustrating the result of the allocating unit 202 of the controller 2 allocating a plurality of processing to the core A 301 and the core B 302, and a lower section of FIG. 6 is a screen illustrating allocation changed by the user.

In addition, processing A to D displayed on the screen illustrated in FIG. 6 are images illustrating an example of the plurality of processing included in the application program 311 divided by the dividing unit 104. The processing A to D are processing that are on execution or in preparation for execution allocated to the core A 301 or the core B 302 after starting the application program 311. The processing A to D are sequentially deleted from the screen when the processing ends. In addition, when another processing included in application program 311 is allocated to the core A 301 or the core B 302, another processing is newly displayed on the screen. For this reason, the processing displayed on the screen illustrated in FIG. 6 changes as the application program 311 progresses. In addition, I/Fs #1 to #3 in FIG. 6 are images illustrating a plurality of I/O interfaces 25a to 25c.

As illustrated in FIG. 6, the display controlling unit 107 according to the present embodiment displays the processing A to D and the I/O interfaces 25a to 25c used in the processing A to D on the display 16 in a corresponding manner. The display controlling unit 107 acquires, as the correspondence between the processing and the I/O interface 25, the information transmitted by the transmitting unit 206 of the controller 2 from the transmitting and receiving unit 108. Alternatively, it may be possible to adopt a configuration in which the correspondence between the processing and the I/O interface 25 is read out from the setup data 310 stored in the storing unit 150 and displayed as the display controlling unit 107.

The display controlling unit 107 changes the display on the display 16 in accordance with the operation of the user. For example, when the display controlling unit 107 acquires an operation of a user who changes one of the plurality of processing from one of the core A 301 and the core B 302 to the other from the receiving unit 101, the display controlling unit 107 changes the display on the display 16. The operation of the user is, for example, a drag and drop operation, but is not limited thereto.

For example, in the example illustrated in the upper section of FIG. 6, the processing A and the processing B are allocated to the core A 301, and the processing C and the processing D are allocated to the core B 302. Here, when the receiving unit 101 receives the drag and drop operation in which the user moves the processing B from the core A 301 to the core B 302, the display controlling unit 107 changes the display on the display 16 as illustrated in the lower section of FIG. 6. That is, as illustrated in the lower section of FIG. 6, on the display 16, the display is changed so that the processing A is allocated to the core A 301 and the processing B, the processing C, and the processing D are allocated to the core B 302. In addition, the I/F #2 (I/O interface 25 b) corresponding to the processing B also moves to the core B 302 as the processing B moves.

Figure 7:
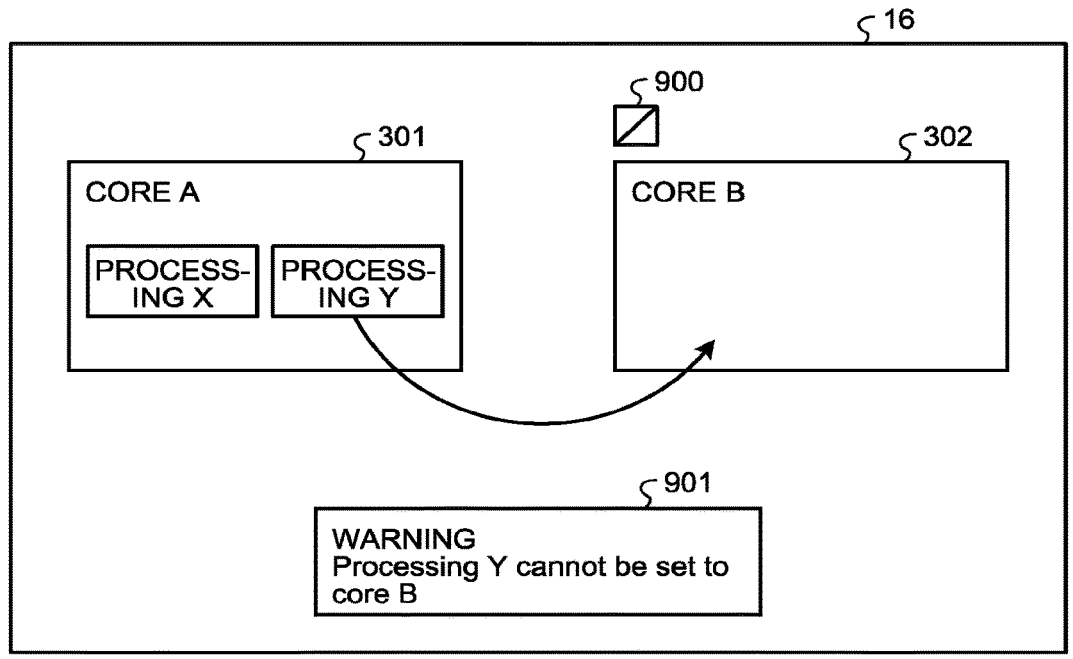
FIG. 7 is a diagram illustrating an example of a warning indication according to the first embodiment.

In addition, when the receiving unit 101 receives an allocation changing operation of separating the non-separable processing, the display controlling unit 107 displays a warning on the display 16. Whether or not the operation of the user is the allocating changing operation of separating the non-separable processing is confirmed by the allocation changing unit 106 described later and notified to the display controlling unit 107. FIG. 7 is a diagram illustrating an example of a warning display according to the present embodiment. Processing X and processing Y allocated to the core A 301 are registered in the setup data 310 as the non-separable processing. When the receiving unit 101 receives an operation for moving the processing Y to the core B 302 on the display 16, the display controlling unit 107 displays a warning on the display 16.

As an example of the warning, the display controlling unit 107 displays "WARNING processing Y cannot be set to core B" or the like, as in a message 901 illustrated in FIG. 7. Alternatively, the display controlling unit 107 displays a symbol such as "/(slash)" indicating that the operation is improper, such as a symbol 900, on the periphery of the core B 302 of a destination of the processing Y illustrated in FIG. 7. The message 901 and the symbol 900 are examples of the warning display and the warning display is not limited thereto. In addition, when all of the processing included in the combination of non-separable processing are moved, it may be possible to adopt a configuration in which the warning is not displayed as the display controlling unit 107. For example, when the processing X and the processing Y are both moved from the core A 301 to the core B 302, the display controlling unit 107 does not display the warning.

In addition, the display controlling unit 107 displays a warning on the display 16 when it is determined by the allocation changing unit 106 that the operation of the user is an improper operation.

Returning to FIG. 5, the allocation changing unit 106 changes the allocation of the processing to the core A 301 and the core B 302 according to the operation of the user received by the receiving unit 101. As described in the lower section of FIG. 6, if the user performs the operation of moving the processing B from the core A 301 to the core B 302, the allocation changing unit 106 adds information on the allocation of the changed processing to the setup data 310 stored in the storing unit 150. For example, the allocation changing unit 106 adds the allocation of the processing A to the core A 301 and the allocation of the processing B to D to the core B 302 to the setup data 310, as illustrated in the lower section of FIG. 6.

In the present embodiment, in order to change the allocation of the processing, since the allocation changing unit 106 updates the setup data 310 instead of the application program 311 itself, the allocation changing unit 106 can change the allocation without modifying and recompiling the application program 311.

In addition, the allocation changing unit 106 confirms whether the change of the allocation by the operation of the user is appropriate, before updating the setup data 310. For example, when the receiving unit 101 receives an allocation changing operation of separating the non-separable processing, the allocation changing unit 106 does not change the allocation. In addition, the allocation changing unit 106 notifies the display controlling unit 107 when receiving the allocation changing operation of separating the non-separable processing.

In addition, when the number of I/O interfaces allocated to each of the core A 301 and the core B 302 exceeds the upper limit or when an operation is received to allocate an I/O interface 25 that cannot be allocated, the allocation changing unit 106 determines that the work is improper. In this case, the allocation changing unit 106 does not change the allocation. In addition, the allocation changing unit 106 notifies the display controlling unit 107.

Figure 8:
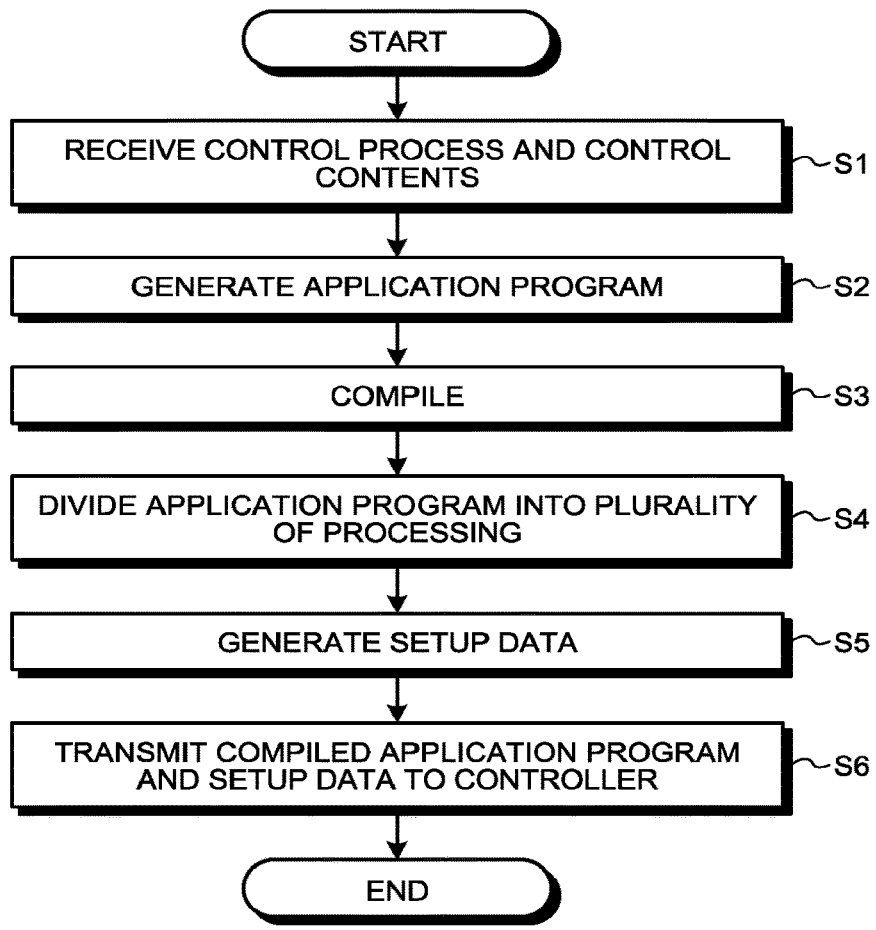
FIG. 8 is a flowchart illustrating an example of a flow of a generating processing of an application program and setup data according to the first embodiment.

Next, a process of generating the application program 311 and the setup data 310 in the PC 1 according to the present embodiment configured as described above will be described. FIG. 8 is a flowchart illustrating an example of a flow of a process of generating an application program 311 and setup data 310 according to the present embodiment. The process of the flowchart in FIG. 8 is performed in the PC 1.

First, the receiving unit 101 receives a control process and control contents which are input by the user (S1). The receiving unit 101 transmits the received control process and control contents to the program generating unit 102.

The program generating unit 102 acquires the control process and the control contents which are input by the user from the receiving unit 101 and generates an application program 311 for execution in the controller 2 (S2). The program generating unit 102 transmits the generated application program 311 to the compiler 103.

The compiler 103 compiles the application program 311 generated by the program generating unit 102 (S3). The compiler 103 stores the application program 311 in an execution form in the storing unit 150.

The dividing unit 104 divides the application program 311 in the execution form into a plurality of processing (S4).

The setup data generating unit 105 generates setup data 310 including definition information on each processing divided by the dividing unit 104 (S5). At this time, the setup data 310 includes definition information capable of specifying each processing, information specifying the I/O interface 25 used in each processing, and information on a combination of the non-separable processing. The setup data generating unit 105 stores the generated setup data 310 in the storing unit 150.

The transmitting and receiving unit 108 transmits the application program 311 in the execution form and setup data 310 to the controller 2 (S6).

Figure 9:
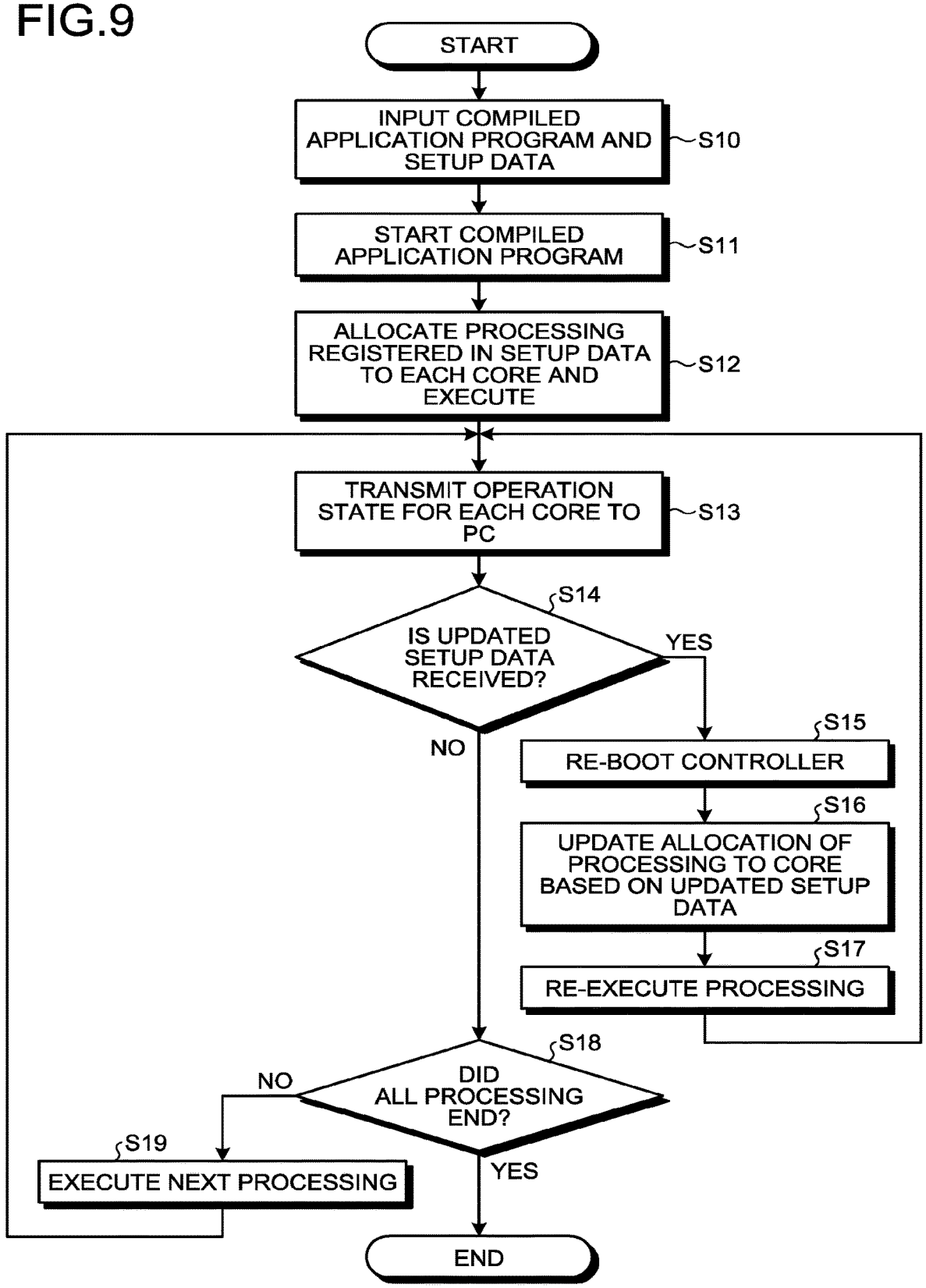
FIG. 9 is a flowchart illustrating an example of a flow of a control processing by the controller according to the first embodiment.

Next, a control processing in the controller 2 according to the present embodiment configured as described above will be described. FIG. 9 is a flowchart illustrating an example of a flow of a control processing by the controller 2 according to the present embodiment.

The input unit 201 inputs the application program 311 in the execution form and setup data 310 from the PC 1 via the tool interface 24 (S10). The input unit 201 stores the inputted application program 311 and setup data 310 in the storing unit 250.

The executing unit 203 starts the application program 311 in the execution form stored in the storing unit 250 (S11).

The allocating unit 202 sequentially searches for processing to be executed among the processing included in the application program 311 from the setup data 310, and allocates the processing to the core A 301 or the core B 302. The executing unit 203 executes the respective processing registered in the setup data 310, in the allocated core A 301 or core B 302 (S12).

Figure 10:
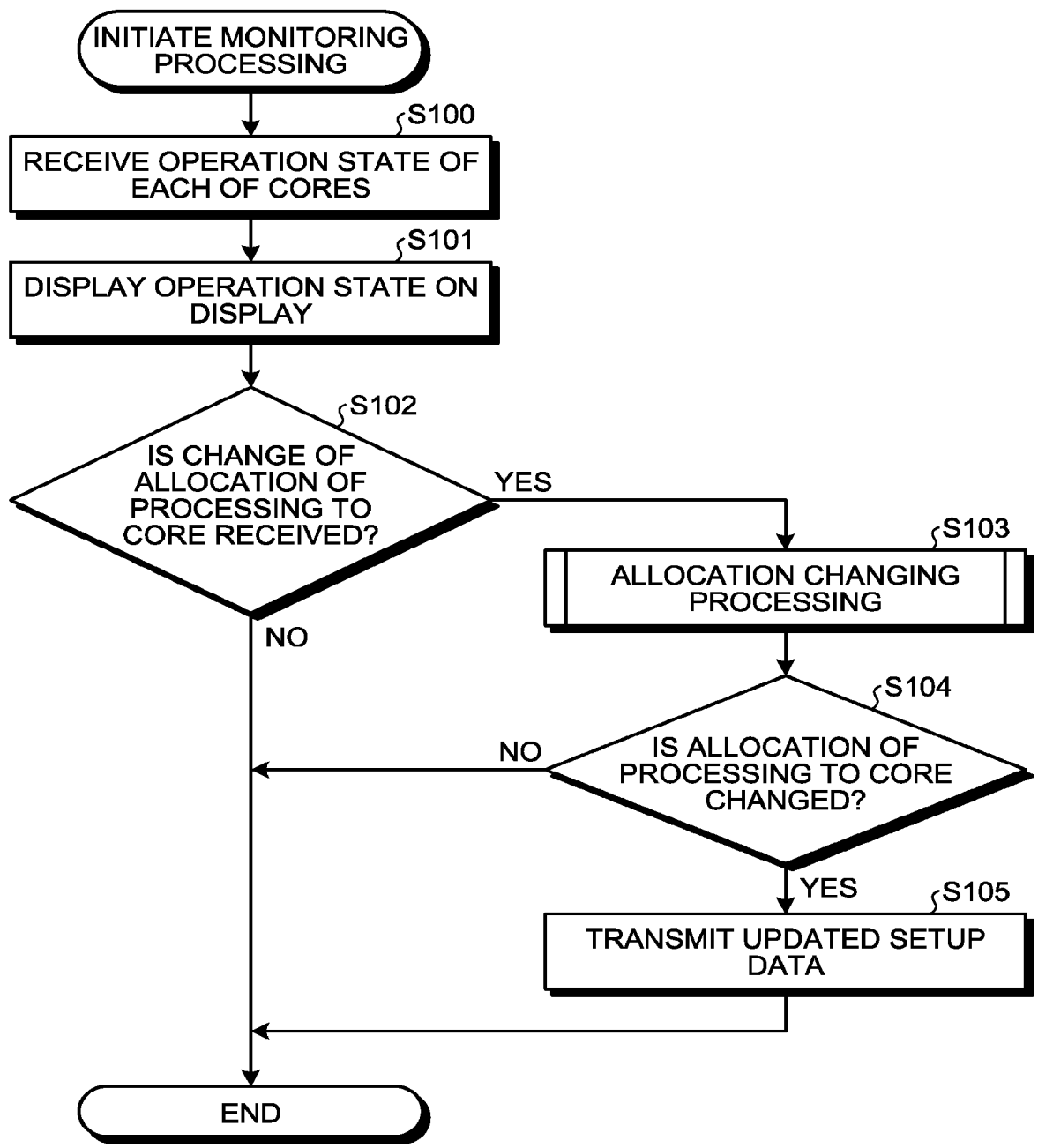
FIG. 10 is a flowchart illustrating an example of a flow of a monitoring processing according to the first embodiment.

The transmitting unit 206 transmits an operation state of each of the core A 301 and the B 302, that is, the allocation of the processing to the core A 301 and the core B 302, and the I/O interface 25 associated with each processing to the PC 1 (S13). Here, in the engineering tool 11 of the PC 1, the monitoring processing illustrated in FIG. 10 is performed, and the allocation of the processing to the core A 301 and the B 302 is changed in some cases. The details of the monitoring processing in the embodiment will be described later.

When the allocation of the processing to the core A 301 and the core B 302 in the engineering tool 11 of the PC 1 is changed, the input unit 201 input the setup data 310 to which information on the changed allocation is added. The input unit 201 stores the updated setup data 310 in the storing unit 250. The input unit 201 may overwrite the setup data 310 stored in the storing unit 250 with the updated setup data 310.

The power controlling unit 205 determines whether or not the input unit 201 has received the updated setup data 310 (S14). If the input unit 201 receives the updated setup data 310 ("Yes" in S14), the power controlling unit 205 reboots the controller 2 (S15).

After the reboot, the updating unit 204 updates the allocation of the processing to the core A 301 and the core B 302 based on the updated setup data 310 (S16). The executing unit 203 re-executes the processing that was executed before the reboot based on the updated allocation to the core A 301 and the B 302 (S17).

When the processing is re-executed, the control processing returns to S13, and the transmitting unit 206 transmits the operation state for each of the core A 301 and the core B 302 to the PC 1 (S13). Each time the allocation to the core A 301 and the core B 302 is changed during execution of the processing, each function unit of the controller 2 repeats the processing from S13 to S17.

If the input unit 201 does not receive the updated setup data 310 ("No" in S14), the executing unit 203 sequentially executes a next processing until all the processing of the application program 311 end ("No" in S18, S19). When the next processing is executed, the control processing returns to S13, and the transmitting unit 206 transmits the operation state for each of the core A 301 and the core B 302 to the PC 1 (S13). When all the processing included in the application program 311 end ("Yes" in S18), the processing of the flowchart ends.

Next, a monitoring processing executed in the PC 1 will be described. FIG. 10 is a flowchart illustrating an example of a fallow of a monitoring processing according to the present embodiment. The processing in the flowchart is initiated when the operation states of the core A 301 and the core B 302 are transmitted from the controller 2 to the PC 1 in S13 of FIG. 9.

The transmitting and receiving unit 108 receives the operation state of each of the core A 301 and the core B 302, that is, the allocation of the processing to the core A 301 and the core B 302, and the I/O interface 25 associated with each processing, from the controller 2 as a result of the allocation of the plurality of processing to each of the core A 301 and the core B 302 (S100).

As illustrated in the upper section of FIG. 6, the display controlling unit 107 displays the operation state of each of the core A 301 and the core B 302 of the controller 2 on the display 16 (S101). The display controlling unit 107 displays the allocation of the processing A to D to the core A 301 and the core B 302 and the I/O interfaces 25 a to 25 c corresponding to the processing A to D on the display 16, and provides a screen for monitoring the operation state of the controller 2 with respect to the user.

If the receiving unit 101 receives from the user an operation of changing the allocation of the processing to the core A 301 and the B302 ("Yes" in S102), the allocation changing unit 106 and the display controlling unit 107 execute the allocation changing processing (S103).

Figure 11:
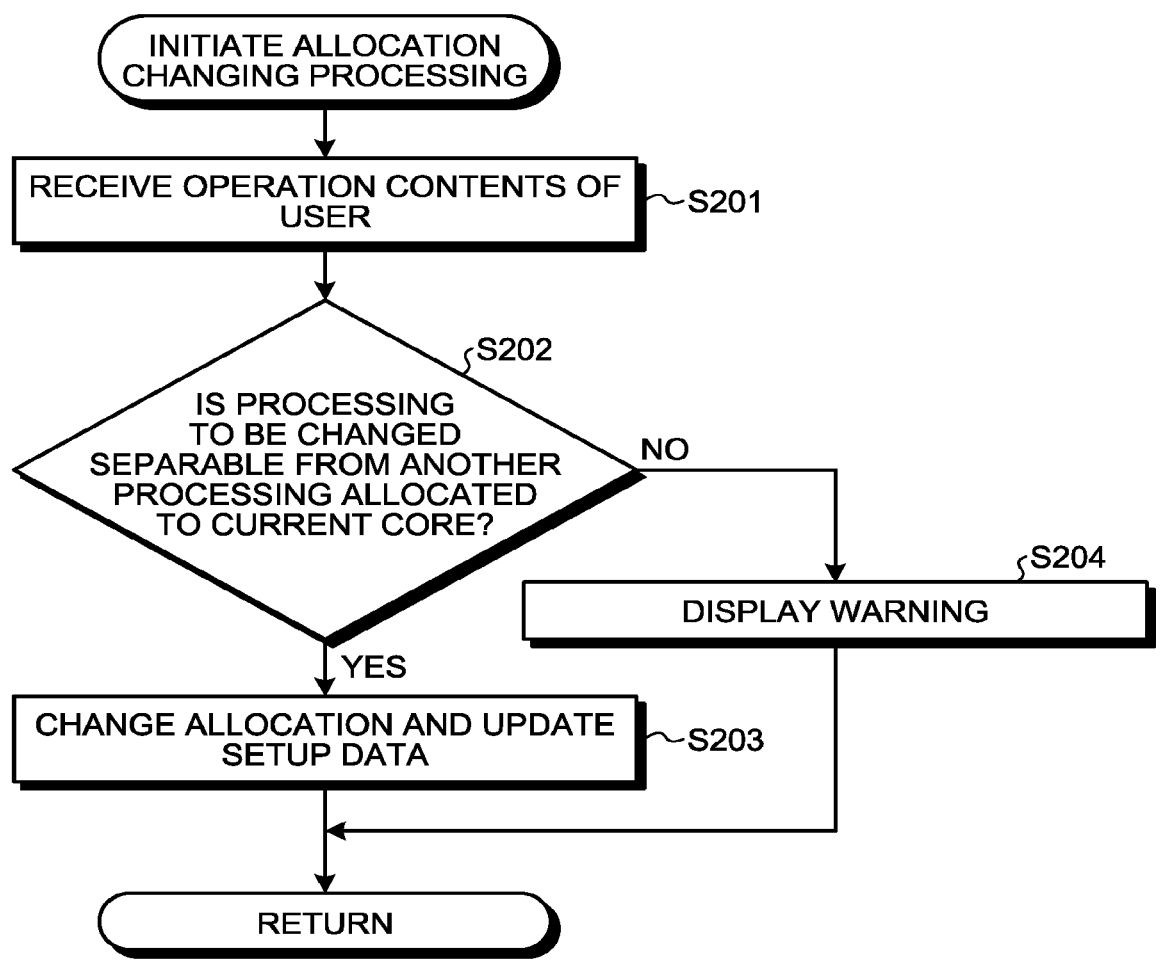
FIG. 11 is a flowchart illustrating an example of a flow of allocation changing processing according to the first embodiment.

FIG. 11 is a flowchart illustrating an example of a flow of the allocation changing processing (S103) according to the present embodiment. First, the receiving unit 101 receives operation contents of the user (S201). That is, the receiving unit 101 receives that an operation of moving on the screen of the display 16 is input to any one of the processing allocated to the core A 301 or the core B 302. The receiving unit 101 transmits to the allocation changing unit 106 and the display controlling unit 107 processing to be moved and whether the processing has been moved from the core A 301 to the core B 302 or from the core B 302 to the core A 301.

The allocation changing unit 106 determines whether or not the processing to be changed is separable from other processing allocated to the current core A 301 or core B 302 (S202). In the example illustrated in FIG. 6, the allocation changing unit 106 determines whether or not the processing B allocated to the core A 301 is separable from the processing A allocated to the same core A 301. The allocation changing unit 106 determines whether or not each processing is separable by determining whether or not each processing is registered in the setup data 310 of the storing unit 150 as the non-separable processing.

If the allocation changing unit 106 determines that the processing to be changed is the separable processing ("Yes" in S202), the allocation changing unit 106 changes the allocation of the processing to be changed and updates the setup data 310 stored in the storing unit 150 (S203). In addition, the allocation changing unit 106 notifies the display controlling unit 107 that the allocation of the processing to be changed can be changed. The display controlling unit 107 changes the display of each processing on the screen in accordance with the operation of the user. In the example illustrated in FIG. 6, the display controlling unit 107 moves the allocation of the processing B from the core A 301 to the core B 302.

Meanwhile, if the allocation changing unit 106 determines that the processing to be changed is the non-separable processing ("No" in S202), the allocation changing unit 106 notifies the display controlling unit 107 that the processing B to be changed cannot be changed. The display controlling unit 107 displays a warning on the display 16 as described with reference to FIG. 7 (S204). In this case, the allocation of the processing is not changed.

Here, the allocation changing processing of the flowchart of FIG. 11 ends and returns to the monitoring processing of FIG. 10. If the allocation changing unit 106 changes the allocation of the processing to the core A 301 and the core B 302 ("Yes" in S104), the allocation changing unit 106 notifies the transmitting and receiving unit 108 of the change. The transmitting and receiving unit 108 transmits the updated setup data 310 to the controller 2 (S105).

Here, the monitoring processing illustrated in FIG. 10 ends. In S105, after the transmitting and receiving unit 108 transmits the updated setup data 310 to the controller 2, the controller 2 performs the reception processing in S14 of FIG. 9.

Thus, in the controller 2 according to the present embodiment, the allocating unit 202 allocates one of the plurality of processing to each of the core A 301 and the core B 302. In addition, according to the controller 2 of the present embodiment, when the input unit 201 inputs the setup data 310 to which the information on the changed allocation is added, the executing unit 203 executes each processing based on the changed allocation when the power controlling unit 205 re-starts the controller 2. Thus, according to the controller 2 of the present embodiment, the allocation to the core A 301 and the core B 302 can be changed during the execution of the processing and the processing can be executed again. For this reason, according to the controller 2 of the present embodiment, it is possible to more flexibly change the allocation of the processing to the core A 301 and the core B 302 according to actual operating conditions.

In addition, according to the controller 2 of the present embodiment, since the allocating unit 202 allocates any one of the plurality of processing to each of the core A 301 and the core B 302, the allocation of the processing is not fixed by the application program 311, and it is possible to apply the same application program 311 to another controller 2.

In addition, according to the PC 1 of the present embodiment, the allocation changing unit 106 of the present embodiment updates the setup data 310 and changes the allocation, in accordance with the operation of the user received by the receiving unit 101. Thus, when the allocation changing unit 106 of the present embodiment changes the allocation of the processing, since the allocation changing unit 106 updates the setup data 310 instead of the application program 311 itself, the allocation changing unit 106 can dynamically and quickly change the allocation without recompiling the application program 311. For this reason, according to the PC 1 of the present embodiment, it is possible to more flexibly change the allocation of the processing to the core A 301 and the core B 302.

In addition, the setup data 310 generated by the setup data generating unit 105 of the PC 1 of the present embodiment includes the combination of the non-separable processing, and when the receiving unit 101 receives the allocation changing operation of separating the non-separable processing, the allocation changing unit 106 does not change the allocation. For this reason, according to the PC 1 of the present embodiment, it is possible to prevent the allocation of improper processing to the core A 301 and the core B 302.

In addition, the setup data 310 generated by the setup data generating unit 105 of the PC 1 of the present embodiment includes information corresponding to each processing and the I/O interface 25, and the display controlling unit 107 displays each processing and the I/O interface 25 on the display 16 in the corresponding manner. For this reason, according to the PC 1 of the present embodiment, it is possible to suppress the allocation of the processing corresponding to the same I/O interface 25 to different core A 301 or core B 302 when the user changes the allocation of the processing.

In addition, the receiving unit 101 of the PC 1 of the present embodiment receives a drag and drop operation of changing one of the plurality of processing displayed on the display 16 from one of the core A 301 and the core B 302 to the other, and the allocation changing unit 106 updates the setup data 310 in accordance with the changed contents of the allocation received by the receiving unit 101. For this reason, according to the PC 1 of the present embodiment, it is possible to provide the user with a screen in which the allocation of the processing can be changed with a simple operation.

In the present embodiment, the engineering tool 11 is the software provided by the PC 1, but is not limited thereto. For example, the engineering tool 11 may be a dedicated management device that can be connected to the controller 2. Alternatively, the engineering tool 11 and the controller 2 may be an integrally formed device.

In the present embodiment, the allocating unit 202 of the controller 2 is configured to add the information on the allocation of the processing to the core A 301 and the core B 302 to the setup data 310 after allocating the processing to the core A 301 and the core B 302, but is not limited thereto. For example, it may be possible to adopt a configuration that does not store the results of allocating the processing to the core A 301 and the core B 302 but performs a new allocation each time the application program 311 is executed as the allocating unit 202. When the configuration is adopted, the allocation may be configured to be stored in the setup data 310 and applied to the next or subsequent execution, only when the allocation changing unit 106 of the PC 1 designates the allocation of the processing to the core A 301 and the core B 302.

Second Embodiment

In the control system S according to the first embodiment, for each of the core A 301 and the core B 302, the allocated processing and the I/O interface 25 used by the processing were displayed on the display 16 in the corresponding manner. The control system S according to the present embodiment further displays the degree of loads on the core A 301 and the core B 302 by each processing on the display 16 of the PC 1.

Figure 12:
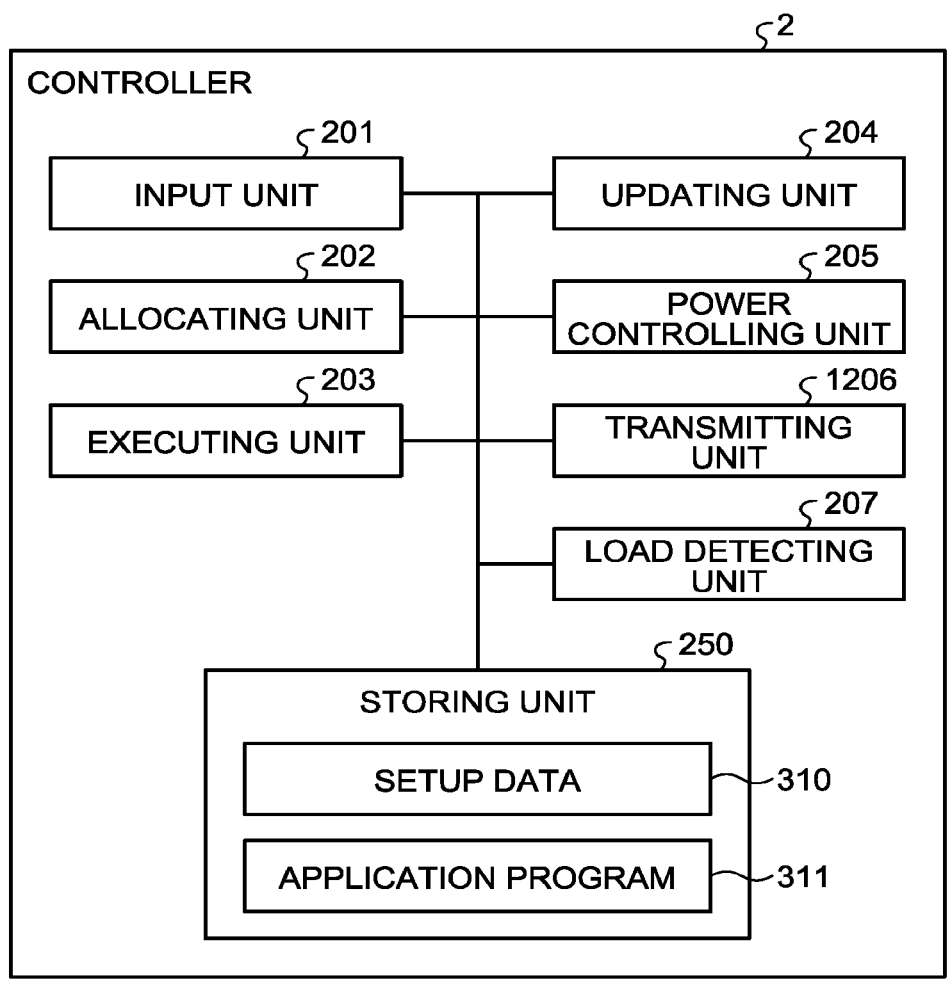
FIG. 12 is a block diagram illustrating an example of a functional configuration of a controller according to a second embodiment.

FIG. 12 is a block diagram illustrating an example of a functional configuration of a controller 2 according to the present embodiment. As illustrated in FIG. 12, the controller 2 according to the present embodiment includes the input unit 201, the allocating unit 202, the executing unit 203, the updating unit 204, the power controlling unit 205, a transmitting unit 1206, a load detecting unit 207, and a storing unit 250. The input unit 201, the allocating unit 202, the executing unit 203, the updating unit 204, the power controlling unit 205, and the storing unit 250 have the same configurations as those of the first embodiment.

The load detecting unit 207 detects the degree of loads of the core A 301 and the core B 302 for each processing. The load detecting unit 207 calculates the degree of load of each of the core A 301 and the core B 302 from a ratio of an execution time of each processing per unit time. For example, in a case where the unit time is 10 ms, when the execution time of the processing A allocated to the core A 301 is 8 ms, the ratio of the execution time of the processing A in the core A 301 is 80%. The unit time should be a fixed period and is not limited to 10 ms. In addition, it may be possible to adopt a configuration in which the degree of loads of the core A 301 and the core B 302 is calculated from the number of times of memory access as the load detecting unit 207. The load detecting unit 207 transmits load information indicating the detected degree of load to the transmitting unit 1206.

The transmitting unit 1206 transmits an operation state and the load information of each of the core A 301 and the core B 302 to the PC 1.

Figure 13:
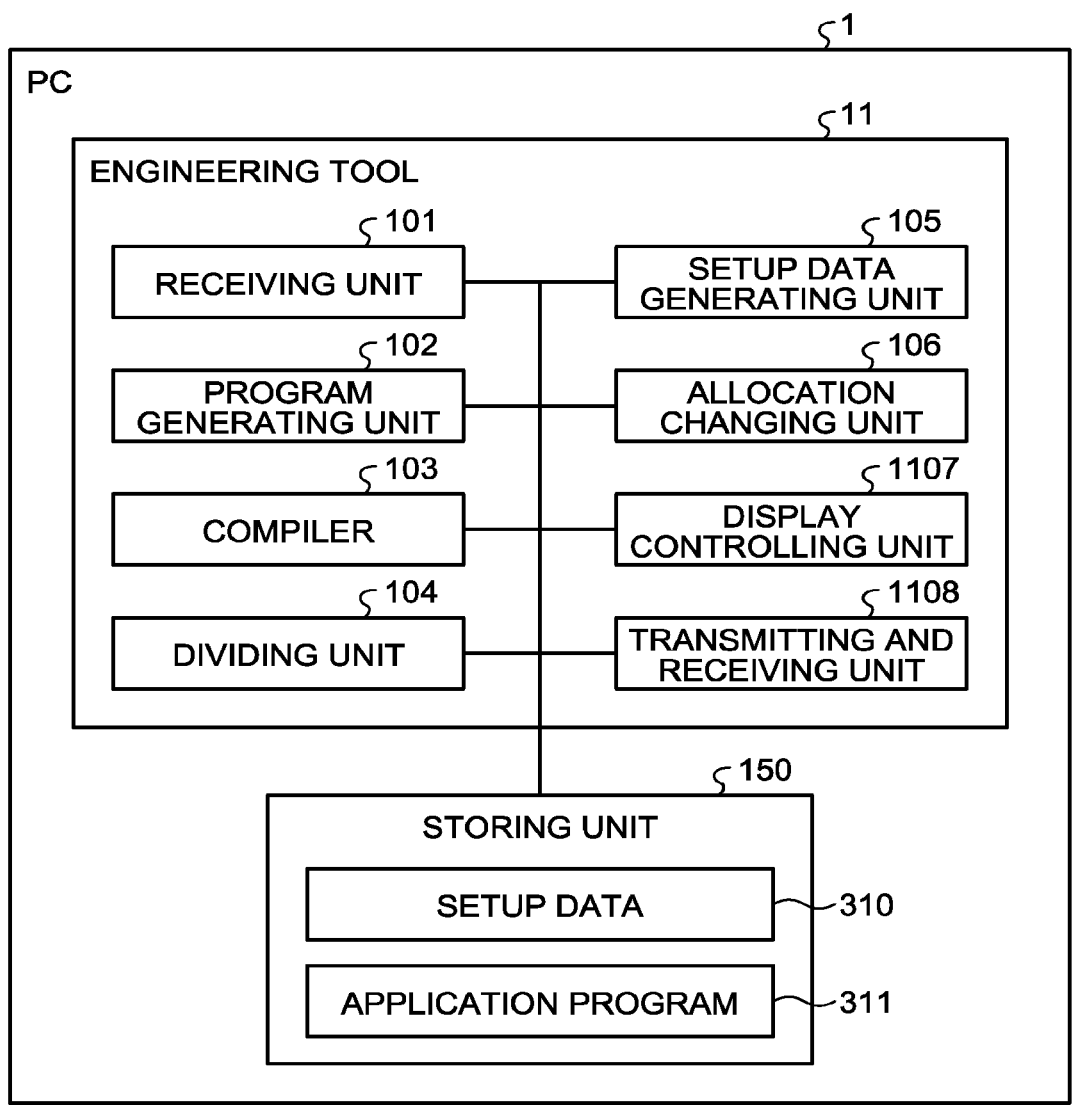
FIG. 13 is a block diagram illustrating an example of a functional configuration of a PC according to the second embodiment.

FIG. 13 is a block diagram illustrating an example of a functional configuration of the PC 1 according to the present embodiment. As illustrated in FIG. 13, the engineering tool 11, which is software operating on the PC 1, includes the receiving unit 101, the program generating unit 102, the compiler 103, the dividing unit 104, the setup data generating unit 105, the allocation changing unit 106, a display controlling unit 1107, and a transmitting and receiving unit 1108. In addition, the PC 1 includes a storing unit 150. The receiving unit 101, the program generating unit 102, the compiler 103, the dividing unit 104, the setup data generating unit 105, the allocation changing unit 106, and the storing unit 150 have the same configurations as those of the first embodiment.

The transmitting and receiving unit 1108 transmits the application program 311 compiled by the compiler 103 and the setup data 310 generated by the setup data generating unit 105 to the controller 2, as in the first embodiment. In addition, when the controller 2 starts the application program 311, the transmitting and receiving unit 1108 receives a load state in addition to an operation state of each of the core A 301 and the core B 302 from the controller 2.

The display controlling unit 1107 acquires the allocation of the plurality of processing to the core A 301 and the core B 302 in the controller 2 and load information, from the transmitting and receiving unit 1108, and displays them on the display 16. In other words, the display controlling unit 1107 provides a monitoring screen for changing the allocation of the processing if necessary to the user to let the user to monitor the operation state and the load information of the core A 301 and the core B 302 of the controller 2.

Figure 14:
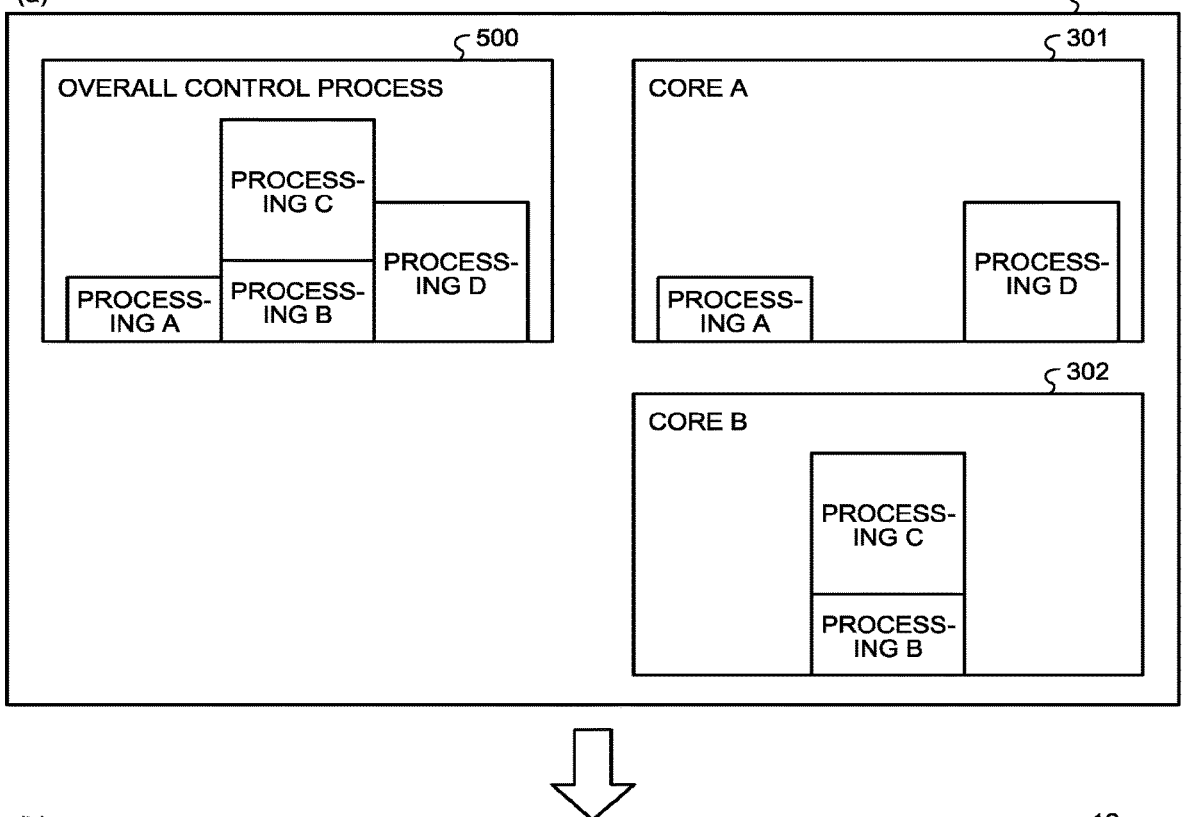
FIG. 14 is a diagram illustrating an example of a monitoring screen according to the second embodiment.
Figure 14:
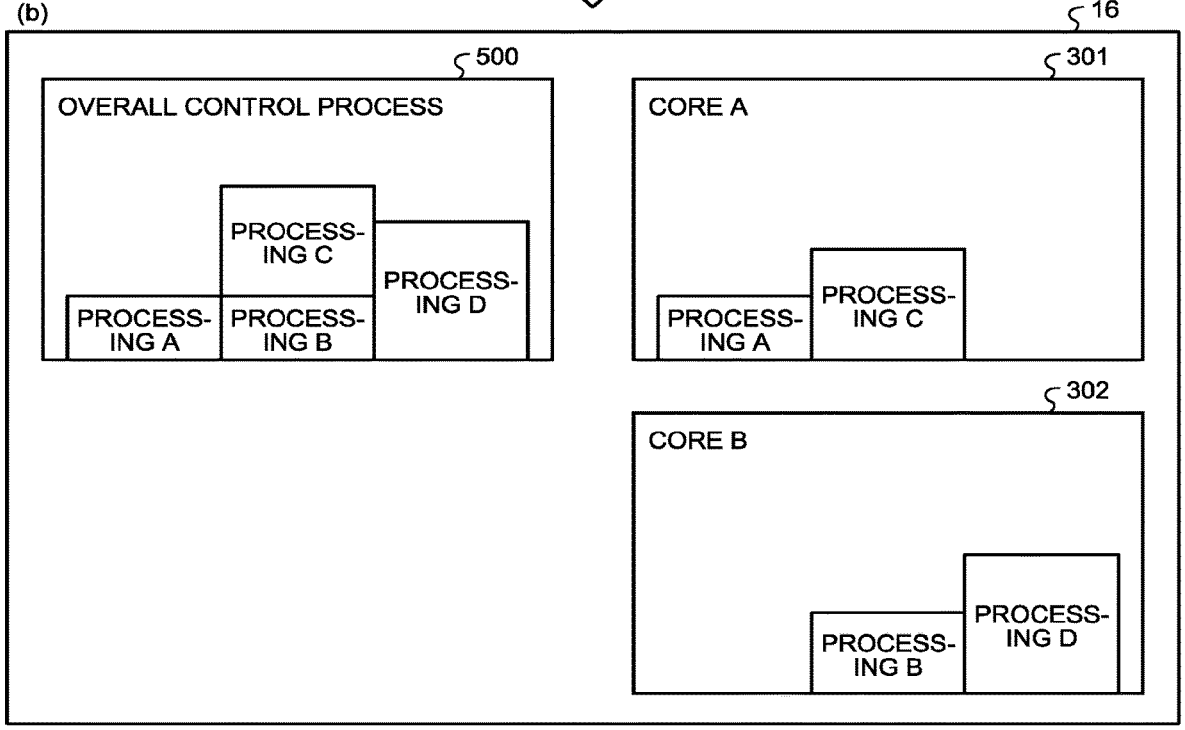

FIG. 14 is a diagram illustrating an example of a monitoring screen according to the present embodiment. An upper section of FIG. 14 illustrates a screen before the allocation of the processing is changed by the user, and a lower section of FIG. 14 illustrates a screen after the allocation of the processing is changed by the user. As illustrated in FIG. 14, the monitoring screen according to the present embodiment includes an image 500 that illustrates an entire control process and an image that displays an executed or running processing allocated to the core A 301 and the core B 302. In each image, a horizontal axis indicates a time and a vertical axis indicates the degree of load. Processing A to D are displayed in a series time manner from the left side to the right side of each image in the order of execution. A horizontal width of each processing indicates the unit time, for example, 10 ms. The horizontal width of each processing should be a fixed period and is not limited to 10 ins.

In the upper section of FIG. 14, the processing A and the processing D are allocated to the core A 301, and the processing B and the processing C are allocated to the core B 302. However, since the processing B and the processing C are executed in the same unit time, the degree of load of core B 302 is higher than that of the core A 301 in the unit time.

In this case, when the receiving unit 101 receives that the user performs an operation of moving the processing C from the core B 302 to the core A 301 on the display 16, the allocation changing unit 106 changes the allocation of the processing C. The display controlling unit 1107 changes the allocation of the processing C on the display 16 to the core A 301 in accordance with the operation of the user and displays the changed allocation. In addition, in the example of the lower section of FIG. 14, since the entire load of the core A 301 becomes higher due to the movement of the processing C, the user further moves the processing D to the core B 302. In the present embodiment, since the load information on the core A 301 and the B 302 for each of the processing A to D is displayed, it is possible to provide information for performing the allocation of the processing more efficiently to the user.

The display controlling unit 1107 according to the present embodiment illustrates the degree of load of the core A 301 and the core B 302 in a graph in which the horizontal axis indicates the time and the vertical axis indicates the degree of load, but is not limited thereto. For example, the display controlling unit 1107 may represent the degree of load for each processing by a numerical value, and may represent the degree of load for each processing step by step like "low", "medium", or "high".

The display controlling unit 1107 may sequentially delete the processing A to D from the display of the display 16 when a predetermined time has elapsed after the processing A to D end. In addition, the display controlling unit 1107 may also display the processing in an execution preparation state allocated to the core A 301 and the core B 302 on the display 16.

In addition, in FIG. 14, although the I/O interface 25 corresponding to the processing A to D is not illustrated, it may be possible to adopt a configuration in which the I/O interface 25 corresponding to the processing A to D is displayed in a graph indicating the degree of load of the processing A to D as the display controlling unit 1107. Alternatively, a configuration in which the user can arbitrarily switch the monitoring screen of the first embodiment described in FIG. 6 and the monitoring screen illustrated in FIG. 14 may be adopted.

A process of generating the application program 311 and the setup data 310 in the PC 1 according to the present embodiment configured as described above is the same as the flowchart of the first embodiment described with reference to FIG. 8.

Figure 15:
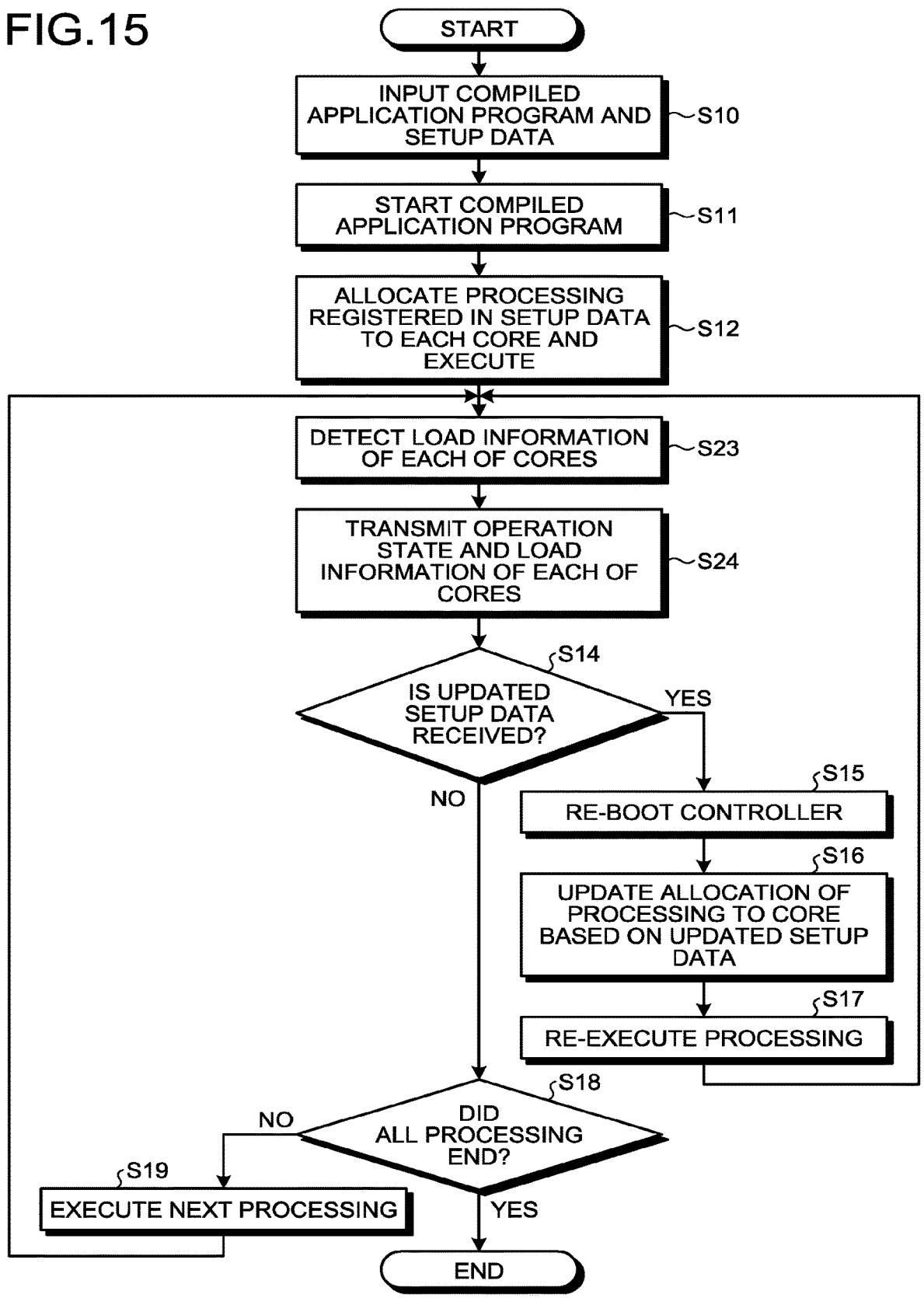
FIG. 15 is a flowchart illustrating an example of an overall flow of a control processing according to the second embodiment.

FIG. 15 is a flowchart illustrating an example of an overall flow of a control processing according to the present embodiment. The flow from the input of the application program 311 and the setup data 310 of S10 to the allocation and execution of the processing of S12 to the core A 301 and the core B 302 is the same as the flow of the processing of the first embodiment described with reference to FIG. 9.

When the execution of the processing is started (S12), the load detecting unit 207 detects the load information of each processing for each of the core A 301 and the core B 302 (S23).

Figure 16:
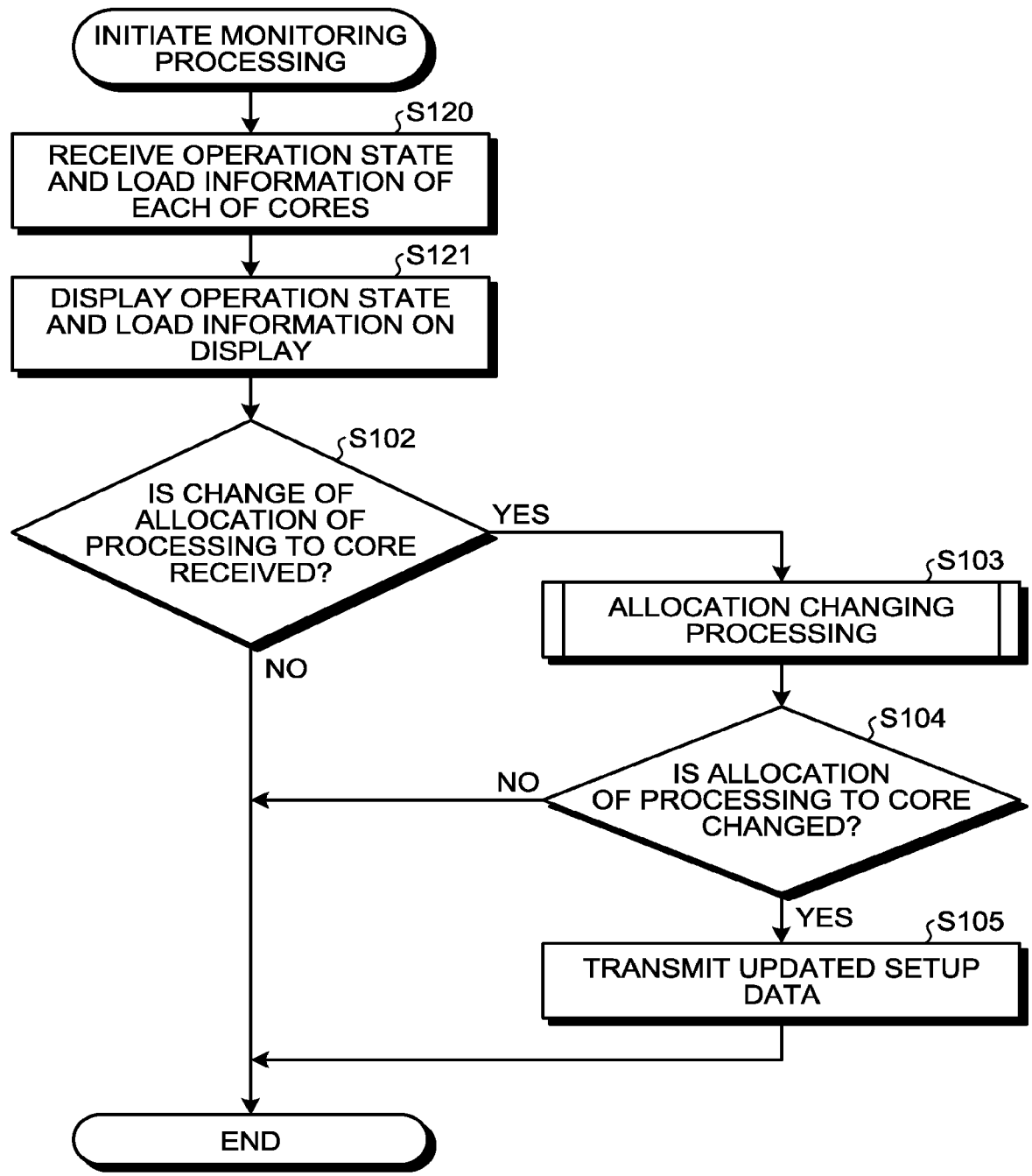
FIG. 16 is a flowchart illustrating an example of a flow of a monitoring processing according to the second embodiment.

The transmitting unit 1206 transmits an operation state and the load information of each of the core A 301 and the core B 302 to the PC 1 (S24). Here, in the engineering tool 11 of the PC 1, the monitoring processing illustrated in FIG. 16 is performed, and the allocation of the processing to the core A 301 and the B 302 is changed in some cases. The details of the monitoring processing in the embodiment will be described later.

The flow from the determination in S14 of whether or not the updated setup data 310 is received to the continuation of the next processing of S19 is the same as the flow of the processing of the first embodiment described with reference to FIG. 9. Similarly to the first embodiment, when all the processing included in the application program 311 end ("Yes" in S18), the processing of the flowchart ends.

Next, the monitoring processing executed in the PC 1 according to the present embodiment will be described. FIG. 16 is a flowchart illustrating an example of a flow of the monitoring processing according to the present embodiment.

The processing in the flowchart is initiated when the operation state and the load information of each of the core A 301 and the core B 302 are transmitted from the controller 2 to the PC 1 in S24 of FIG. 15.

The transmitting and receiving unit 1108 receives the operation state and the load information of each of the core A 301 and the core B 302 from the controller 2 (S120).

As illustrated in the upper section of FIG. 14, the display controlling unit 1107 displays the operation state of each of the core A 301 and the core B 302 of the controller 2 on the display 16 (S121).

The flow from the determination of whether or not the operation of changing the allocation by the user is received of S102 to the transmission of the updated setup data 310 of S105 is the same as the flow of the processing of the first embodiment described with reference to FIG. 10.

As described above, according to the PC 1 of the present embodiment, the transmitting and receiving unit 1108 acquires the load information indicating the degree of load on each of the core A 301 and the core B 302 of the controller 2 by the plurality of processing from the controller 2, and the display controlling unit 1107 displays the degree of load of the core A 301 and the core B 302 on the display 16. For this reason, according to the PC 1 of the present embodiment, it is possible to provide the user with the information for appropriately changing the allocation of the processing to the core A 301 and the core B 302 in addition to the same effect as the first embodiment.

In addition, according to the controller 2 of the present embodiment, since the load detecting unit 207 detects the degree of load on each processing allocated to the core A 301 and the core B 302, it is possible to detect the operation state of the controller 2 with high precision in addition to the effect similar to that of the first embodiment.

As described above, according to the PC 1 and the controller 2 of the first and second embodiments, it is possible to more flexibly change the allocation of the processing to the core A 301 and the core B 302.

In addition, the control processing program executed in the controller 2 of each of the above-described embodiments is provided to be embedded in ROM or the like in advance. The control processing program executed in the controller 2 of each of the above-described embodiments may be configured to be recorded in a computer-readable recording medium such as a CD-ROM, flexible disk, CD-R, or DVD in an installable or executable format. In addition, the control processing program executed in the controller 2 of each of the above-described embodiments may be configured to be stored on a computer connected to a network such as the Internet and provided by downloading via the network. In addition, the control processing program executed in the controller 2 of each of the above-described embodiments may be configured to be provided or distributed via the network such as the Internet.

The control processing program executed in the controller 2 of each of the above-described embodiments has a module configuration including the above-described units (input unit, allocating unit, executing unit, updating unit, power controlling unit, transmitting unit, and load detecting unit), and as practical hardware, the multi-core CPU 20 reads and executes the control processing program from the ROM, and the respective units are loaded on a main storage device, so that the input unit, the allocating unit, the executing unit, the updating unit, the power controlling unit, the transmitting unit, and the load detecting unit are generated on the main storage device.

The engineering tool 11, which is the software executed in the PC 1 of each of the above-described embodiments is provided to be recorded in a computer-readable recording medium such as a CD-ROM, flexible disk (FD), CD-R, or digital versatile disk (DVD) in a file of an installable or executable format. In addition, the engineering tool 11 executed in the PC 1 of each of the above-described embodiments may be configured to be stored on a computer connected to a network such as the Internet and provided by downloading via the network. In addition, the engineering tool 11 executed in the PC 1 of each of the above-described embodiments may be configured to be provided or distributed via the network such as the Internet. In addition, the engineering tool 11 of each of the above-described embodiments may be configured to be provided to be embedded in ROM or the like in advance.

The engineering tool 11, which is the software executed in the PC 1 of each of the above-described embodiments has a module configuration including the above-described units (receiving unit, program generating unit, compiler, dividing unit, setup data generating unit, allocation changing unit, display controlling unit, and transmitting and receiving unit), and as practical hardware, the CPU 13 reads and executes the program from the storage medium, and the respective units are loaded on a main storage device, so that the receiving unit, the program generating unit, the compiler, the dividing unit, the setup data generating unit, the allocation changing unit, the display controlling unit, and the transmitting and receiving unit are generated on the main storage device.

Although the embodiments of the present invention have been described, the embodiments have been presented as examples and are not intended to limit the scope of the present invention. The new embodiments can be implemented in various other forms and can be omitted, replaced or modified in various ways without departing from the spirit of the present invention. The embodiments and variations thereof are included in the scope and spirit of the invention, and are also included within the scope of equivalents to the claims.

The invention claimed is:

1. A programmable controller comprising:
a processor including a plurality of processor cores;
a plurality of interfaces configured to input and output signals from an external device; and
input circuitry configured to input from a management device connected to the programmable controller, an application program for execution in the plurality of processor cores, and setup data including information corresponding to a plurality of processing included in the application program and the interfaces,
wherein
the processor is configured to:
allocate any one of the plurality of processing to each of the plurality of processor cores,
transmit the plurality of processor cores and an allocation result of the plurality of processing to the management device,
restart when the allocation of the plurality of processing to the plurality of processor cores is changed in the management device and the input circuitry inputs the setup data to which information on the changed allocation is added,
update the allocation to the plurality of processor cores based on the setup data after the restart, and
execute the plurality of processing based on the allocation, and when the allocation is changed, execute the plurality of processing based on the changed allocation, and wherein in the allocating, the processor is further configured to allocate the processing using a same interface to a same processor core, based on the setup data.

2. A management device comprising:
a processor configured to:
generate setup data including information on a plurality of processing included in an application program to be executed in a programmable controller,
acquire, from the programmable controller, an allocation of the plurality of processing to each of a plurality of processor cores of the programmable controller,
display the allocation of the plurality of processing to the plurality of processor cores on a display,
receive an operation of a user changing the allocation, and
change the allocation by updating the setup data in accordance with the operation,
wherein the setup data includes information on an interface corresponding to processing of the plurality of processing allocated to one of the plurality of processor cores,
wherein the processor is further configured to display the plurality of processing and the interfaces on the display in a manner corresponding to each other,
wherein the management device is a device different from the programmable controller, and
wherein the setup data is data in which each of the plurality of processing included in the application program is corresponding to, among the plurality of interfaces, an interface used by the processing.

3. The management device according to claim 2, wherein the setup data includes information on a combination of non-separable processing, which are the plurality of processing that are not allocated to different processor cores, among the plurality of processing, and
the processor does not change the allocation when the processor receives an allocation changing operation of separating the non-separable processing.

4. The management device according to claim 2, wherein the processor is further configured to:
receive a drag and drop operation for changing the allocation of one of the plurality of processing displayed on the display from one processor core to another processor core, and
update the setup data in accordance with changed contents of the allocation.

5. The management device according to claim 2, wherein the processor is further configured to:
acquire, from the programmable controller, load information indicating a load on each of the plurality of processor cores of the programmable controller by the plurality of processing, and
display a load of each of the plurality of processing allocated to the plurality of processor cores on the display.

6. A control system including a programmable controller and a management device, wherein
the programmable controller includes:
a first processor including a plurality of processor cores;
a plurality of interfaces configured to input and output signals from an external device;
an input unit configured to input from the management device connected to the programmable controller, an application program for being executed in the plurality of processor cores, and setup data including information corresponding to a plurality of processing configuring the application program and the interfaces, wherein the first processor is configured to:

allocate any one of the plurality of processing to each of the plurality of processor cores, transmit the plurality of processor cores and an allocation result of the plurality of processing to the management device, restart when the allocation of the plurality of processing to the plurality of processor cores is changed in the management device and the input unit inputs the setup data to which information on the changed allocation is added, update the allocation to the plurality of processor cores based on the setup data after the restart, and execute the plurality of processing based on the allocation, and when the allocation is changed, execute the plurality of processing based on the changed allocation, and wherein, in the allocating, the first processor is configured to allocate the processing using a same interface to a same processor core, based on the setup data, wherein the management device includes a second processor configured to:

generate the setup data, acquire, from the programmable controller, an allocation of the plurality of processing to each of the plurality of processor cores of the programmable controller, display the allocation of the plurality of processing to the plurality of processor cores on a display, receive an operation of a user changing the allocation, and change the allocation in accordance with the received operation.

* * * * *